(12) United States Patent
Cicci et al.

(10) Patent No.: US 8,146,338 B1
(45) Date of Patent: Apr. 3, 2012

(54) ADJUSTABLE RAKE FOR FEED MATERIAL WITH MULTIPLE WIDTH ADJUSTMENT

(75) Inventors: George Cicci, Fitchburg, WI (US);
William Bassett, Brodhead, WI (US);
Jeffrey Marggi, Oregon, WI (US)

(73) Assignee: Kuhn North America, Inc., Brodhead, WI (US)

( * ) Notice: Subject to any disclaimer, the term of this patent is extended or adjusted under 35 U.S.C. 154(b) by 0 days.

(21) Appl. No.: 12/947,519

(22) Filed: Nov. 16, 2010

(51) Int. Cl.
*A01D 76/00* (2006.01)
*A01D 78/00* (2006.01)
*A01D 80/00* (2006.01)
*A01D 84/00* (2006.01)

(52) U.S. Cl. .......................... 56/377; 56/385
(58) Field of Classification Search .................. 56/377, 56/375, 365, 376, 384, 385, 378; 172/311, 172/456, 458, 459, 662
See application file for complete search history.

(56) References Cited

U.S. PATENT DOCUMENTS

| | | | | |
|---|---|---|---|---|
| 4,723,402 A * | 2/1988 | Webster et al. | ............. | 56/377 |
| 4,932,197 A * | 6/1990 | Allen | ............. | 56/377 |
| 4,947,631 A * | 8/1990 | Kuehn | ............. | 56/377 |
| 5,062,260 A * | 11/1991 | Tonutti | ............. | 56/380 |
| 5,065,570 A * | 11/1991 | Kuehn | ............. | 56/377 |
| 5,127,216 A * | 7/1992 | Kelderman | ............. | 56/15.9 |
| 5,493,853 A * | 2/1996 | Tonutti | ............. | 56/377 |
| 5,540,040 A * | 7/1996 | Peeters | ............. | 56/377 |
| 5,598,691 A * | 2/1997 | Peeters | ............. | 56/377 |
| 5,685,135 A * | 11/1997 | Menichetti | ............. | 56/365 |
| 5,899,055 A * | 5/1999 | Rowse et al. | ............. | 56/377 |
| 6,212,866 B1* | 4/2001 | Rowse et al. | ............. | 56/384 |
| 6,314,710 B1* | 11/2001 | Tonutti | ............. | 56/378 |
| 6,543,212 B2* | 4/2003 | Tonutti | ............. | 56/375 |
| 6,834,488 B2* | 12/2004 | Menichetti | ............. | 56/378 |
| 6,945,024 B2* | 9/2005 | Tonutti | ............. | 56/377 |
| 7,007,450 B2* | 3/2006 | Tonutti | ............. | 56/377 |
| 7,313,904 B2* | 1/2008 | Hruska et al. | ............. | 56/378 |
| 7,318,312 B2 | 1/2008 | Cicci et al. | | |
| 7,360,353 B2* | 4/2008 | Hruska et al. | ............. | 56/377 |
| 7,584,595 B2 | 9/2009 | Marggi et al. | | |
| 2005/0144925 A1* | 7/2005 | Rowse et al. | ............. | 56/377 |
| 2005/0284126 A1* | 12/2005 | Giovannini | ............. | 56/377 |
| 2007/0068134 A1* | 3/2007 | Cicci et al. | ............. | 56/377 |
| 2007/0074499 A1* | 4/2007 | Giovannini | ............. | 56/378 |

* cited by examiner

*Primary Examiner* — Arpad Fabian-Kovacs
(74) *Attorney, Agent, or Firm* — Oblon, Spivak, McClelland, Maier & Neustadt, L.L.P.

(57) ABSTRACT

An adjustable rake for raking agricultural products includes a wheeled cart configured to be pulled in a direction of travel on a surface of travel and first and second rake arm positioners coupled to the wheeled cart and configured to translate in a direction transverse to the direction of travel of the wheeled cart. First and second front rake arm assemblies are pivotably coupled to the first and second rake arm positioners, respectively. First and second inner rear supports are included, and each of the first and second inner rear supports is pivotably coupled to the wheeled cart and is configured to pivot as a result of translation of the first and second rake arm positioners in the direction transverse to the direction of travel of the wheeled cart. The rake may include optional splitter wheels.

31 Claims, 32 Drawing Sheets

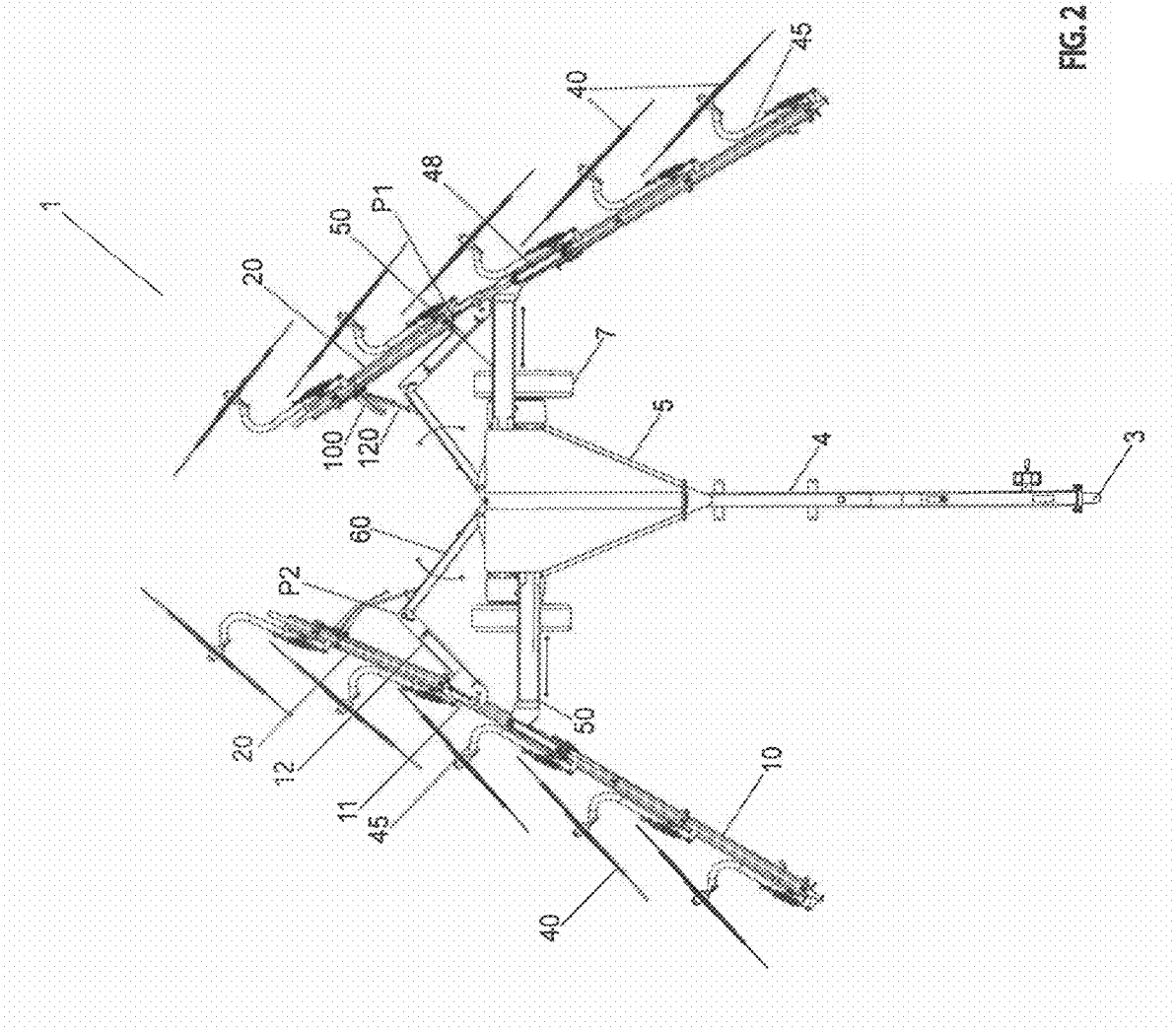

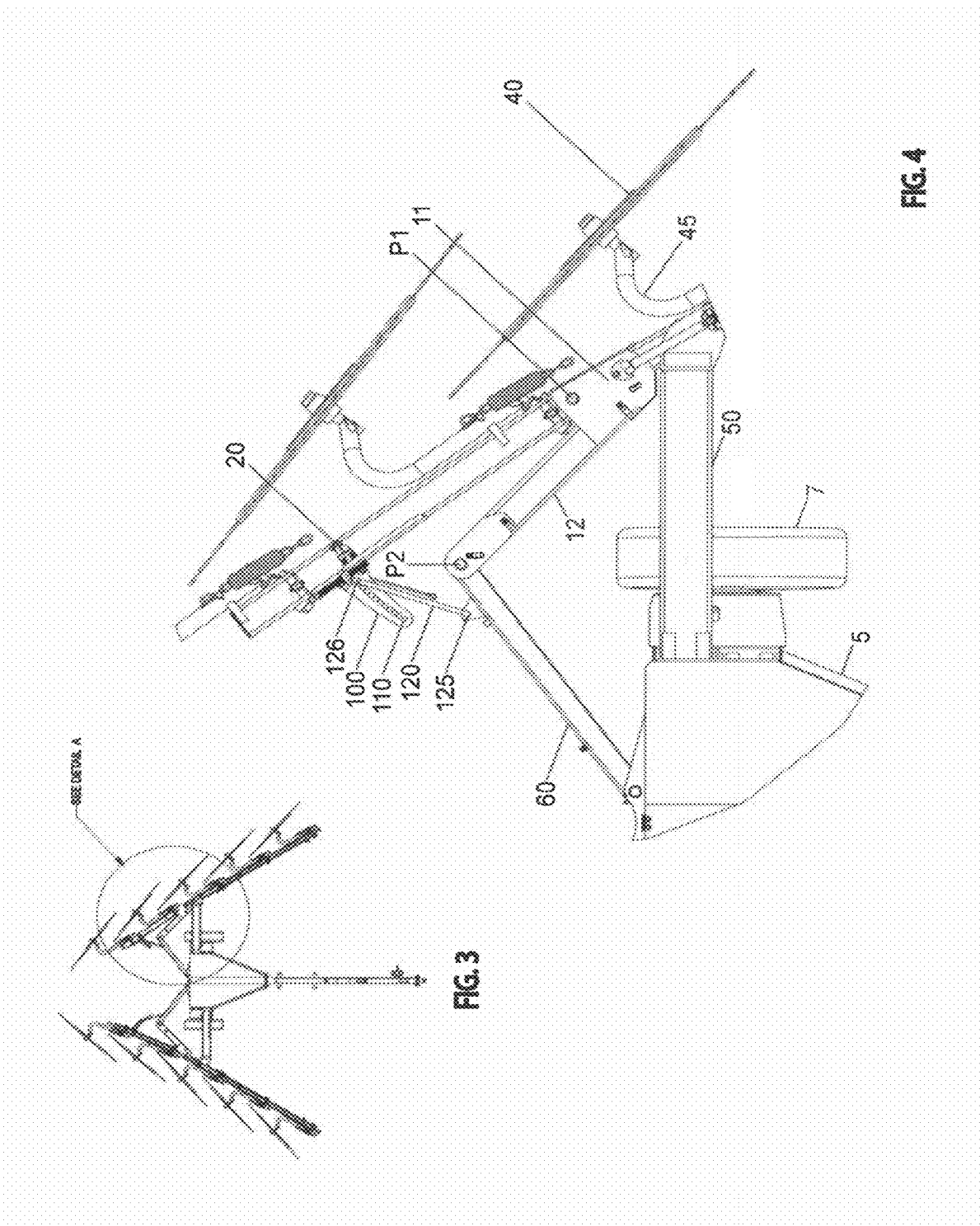

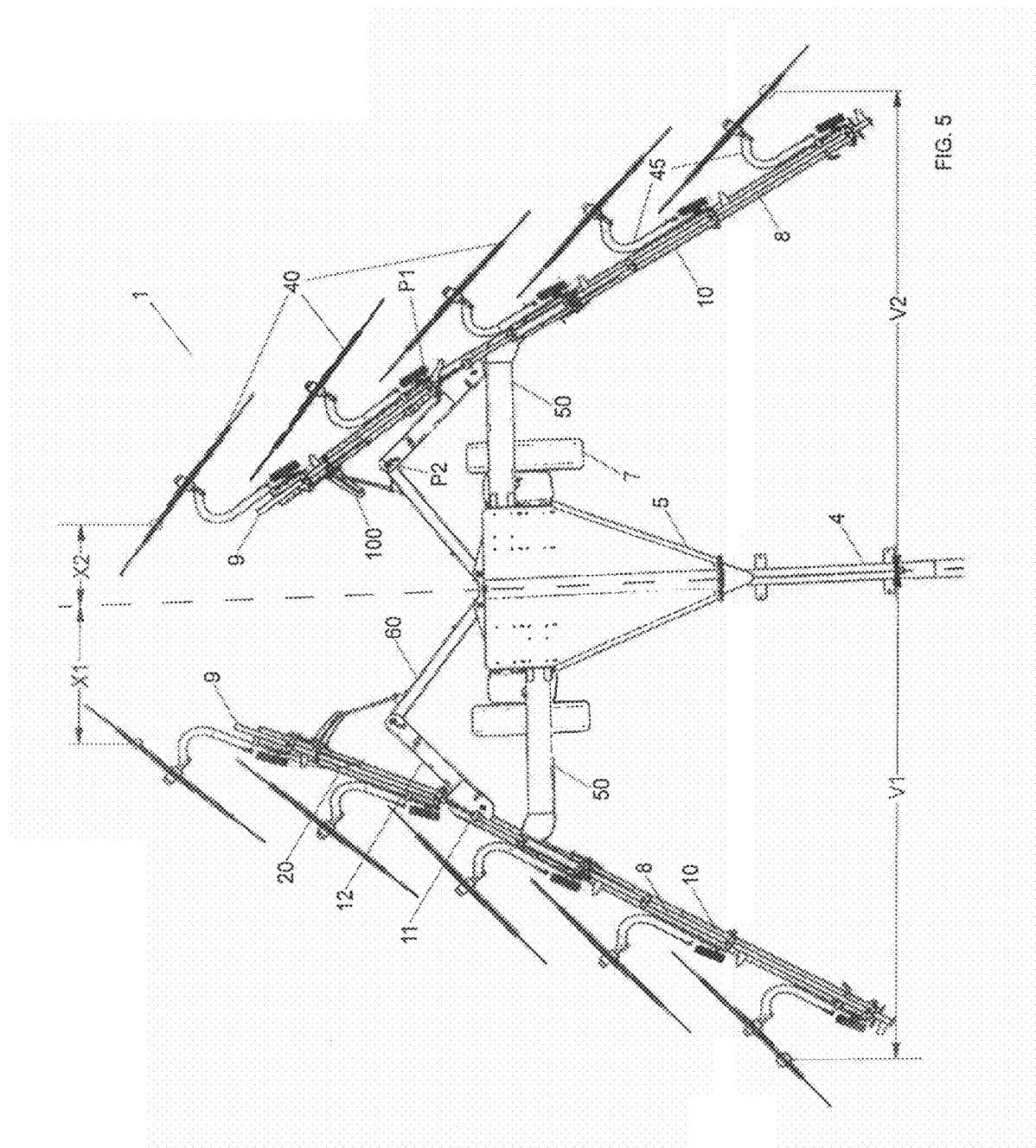

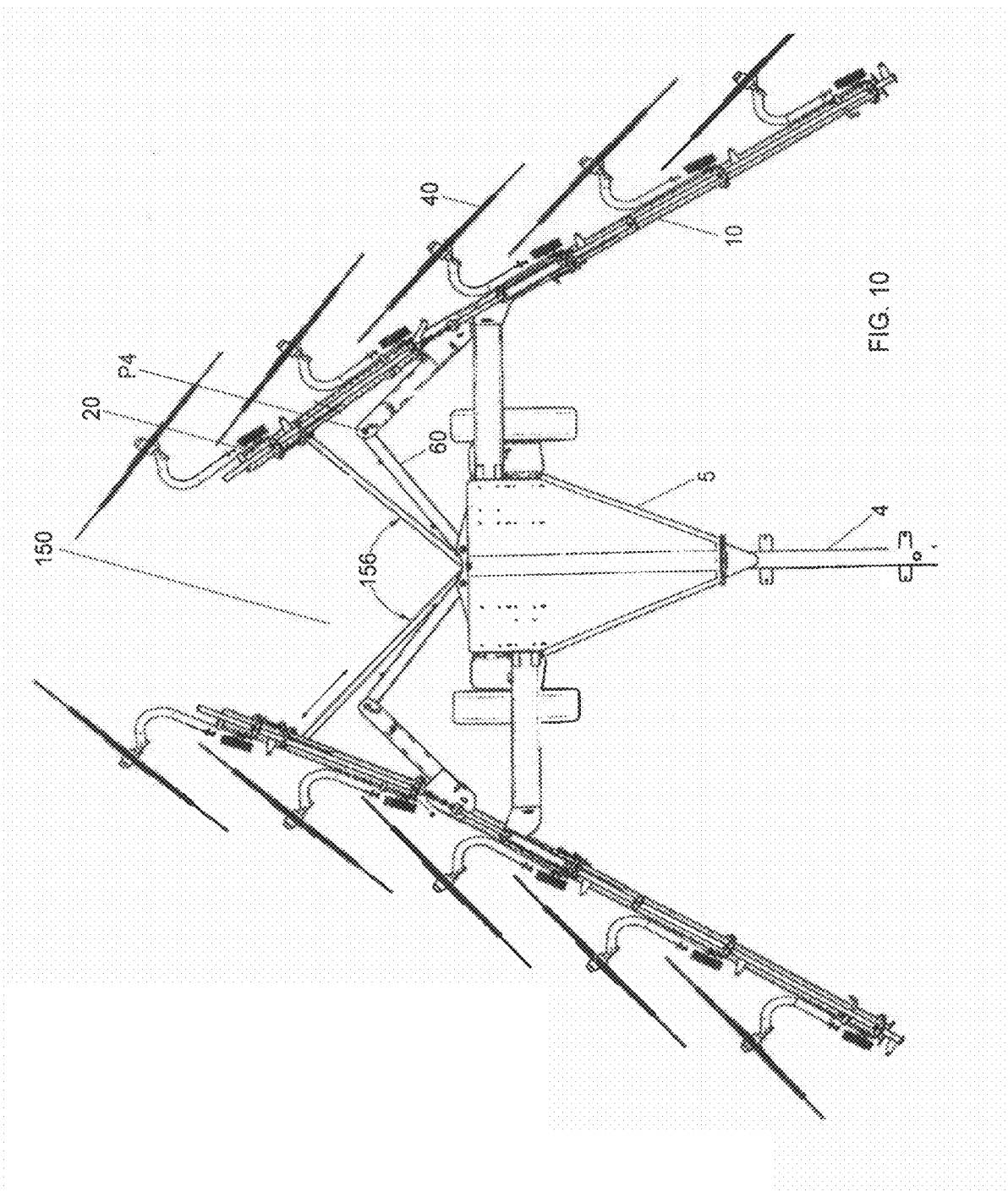

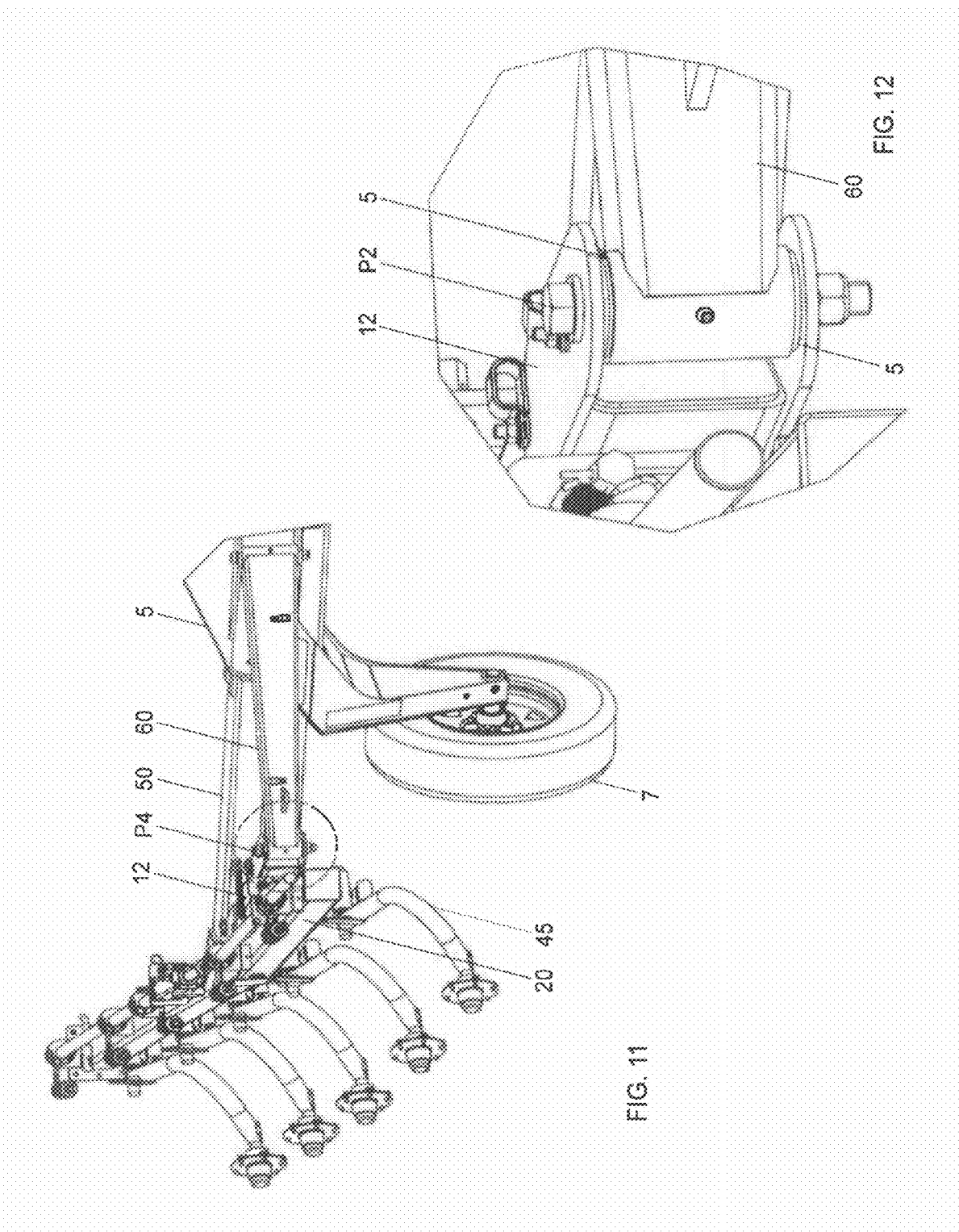

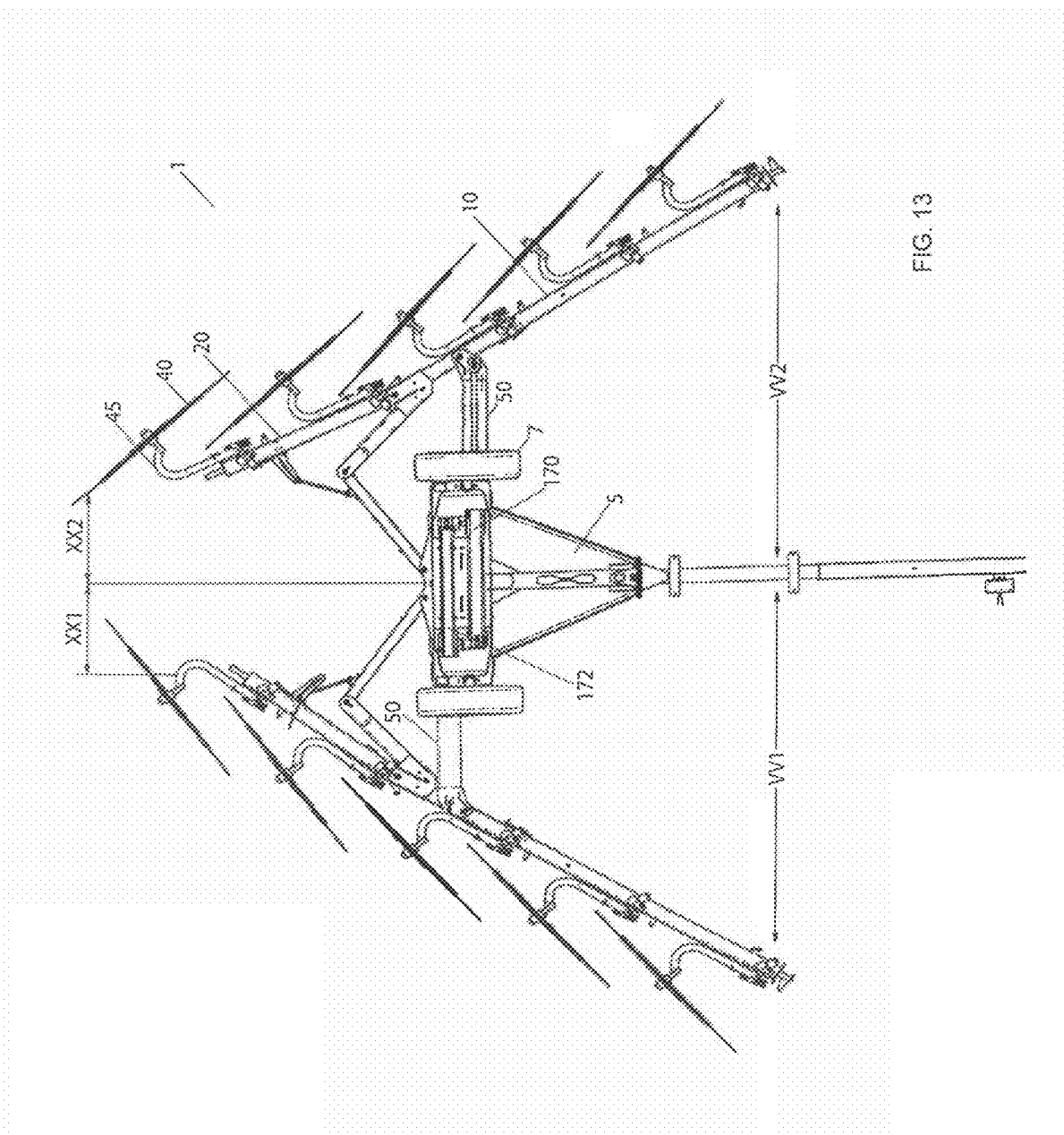

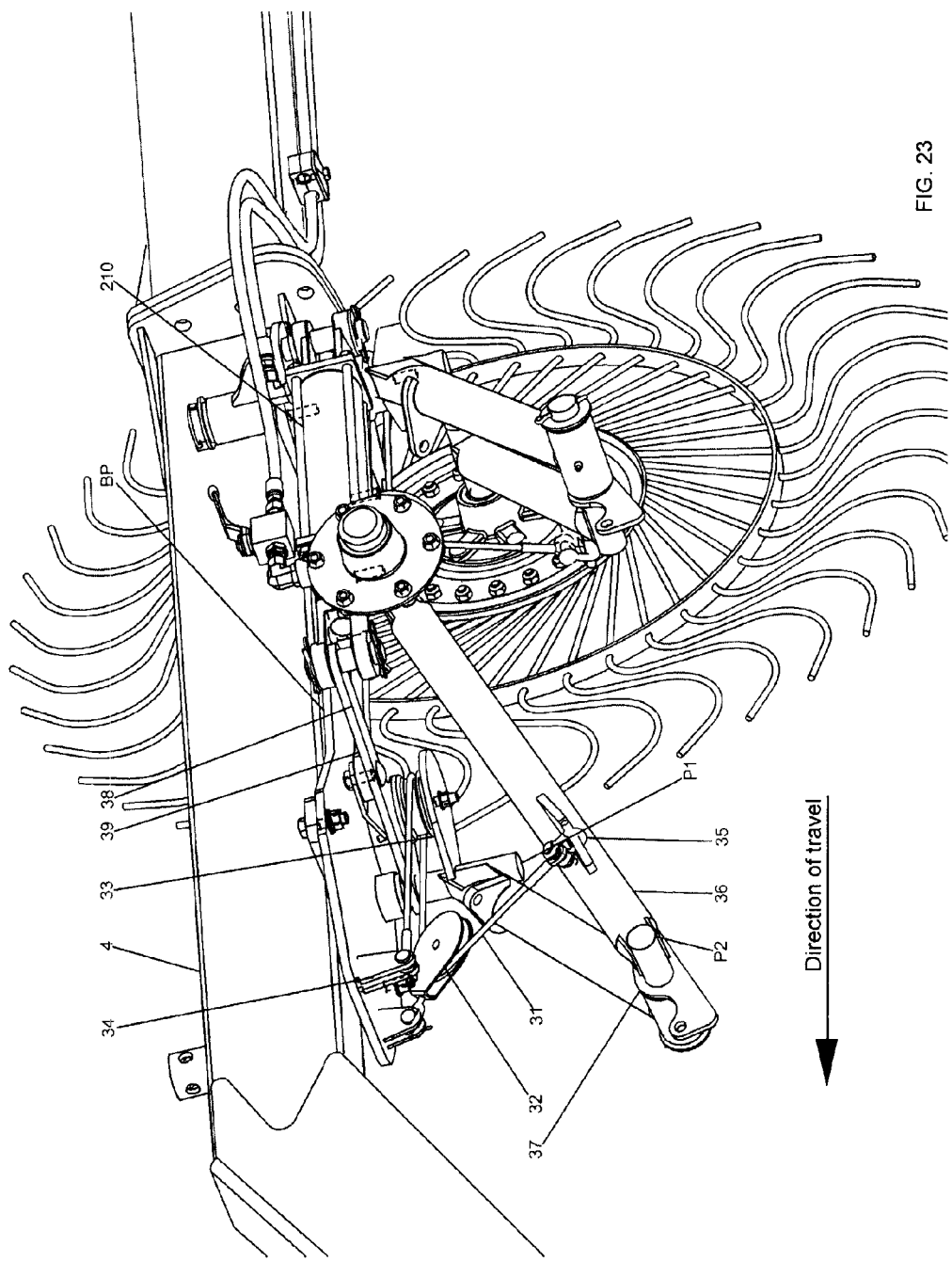

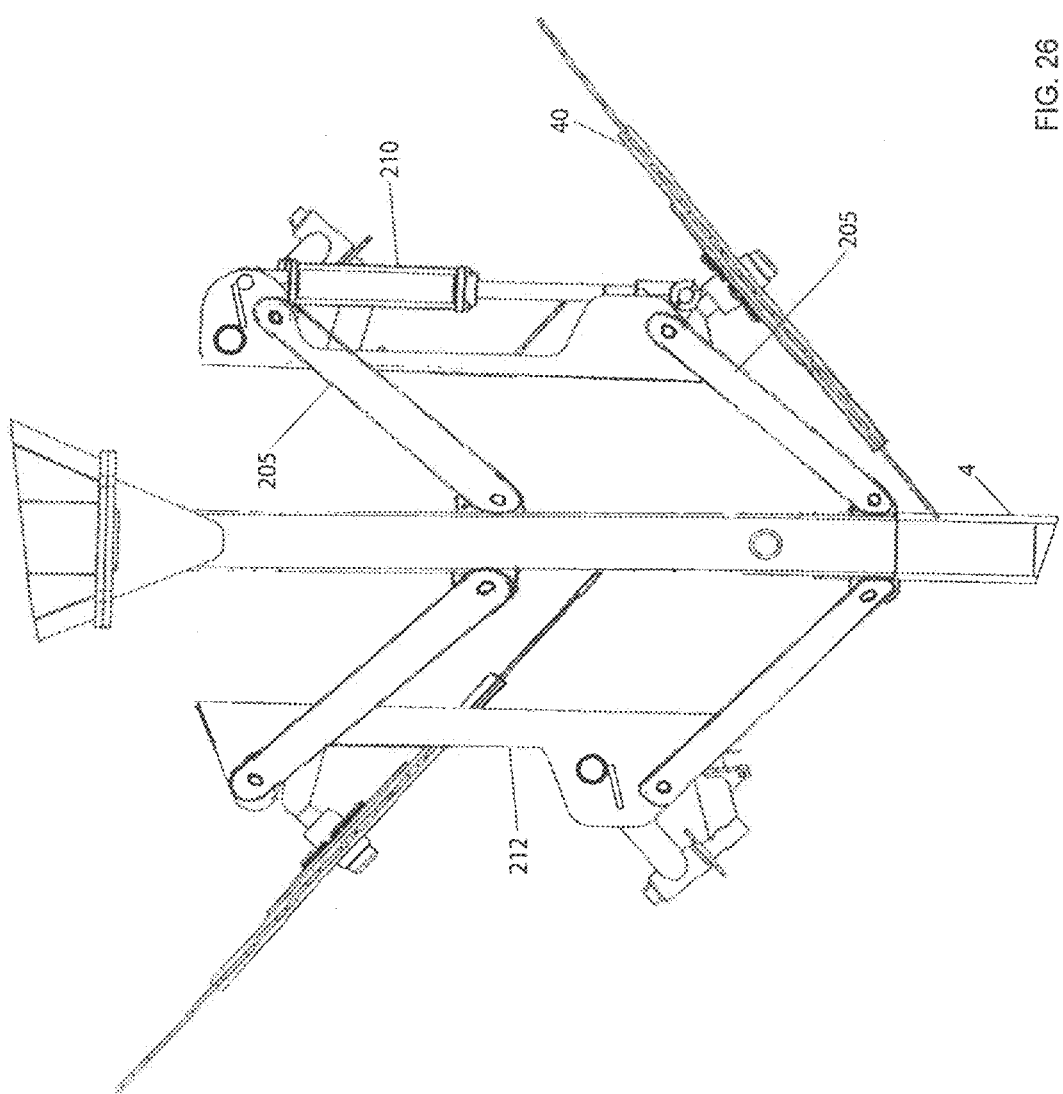

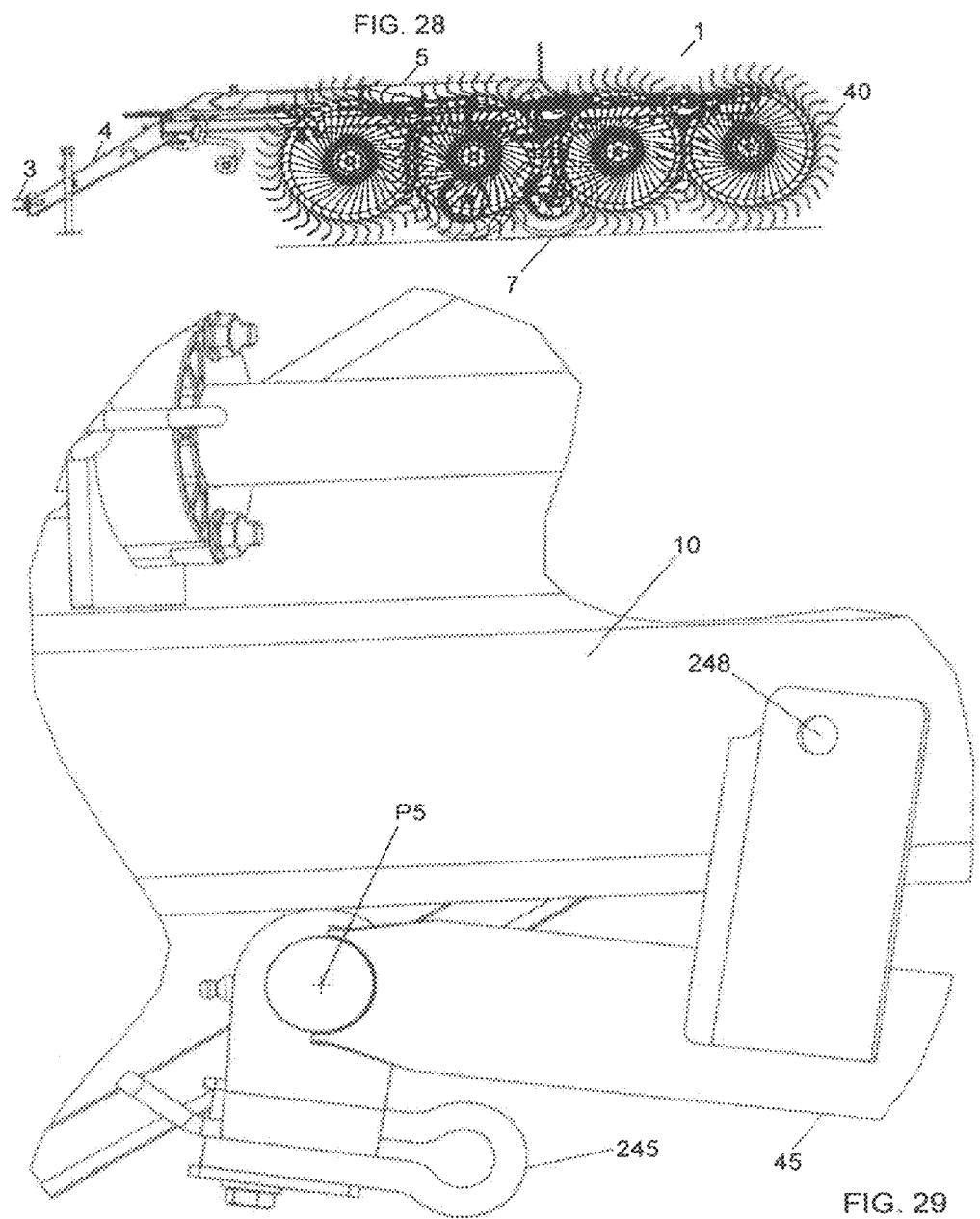

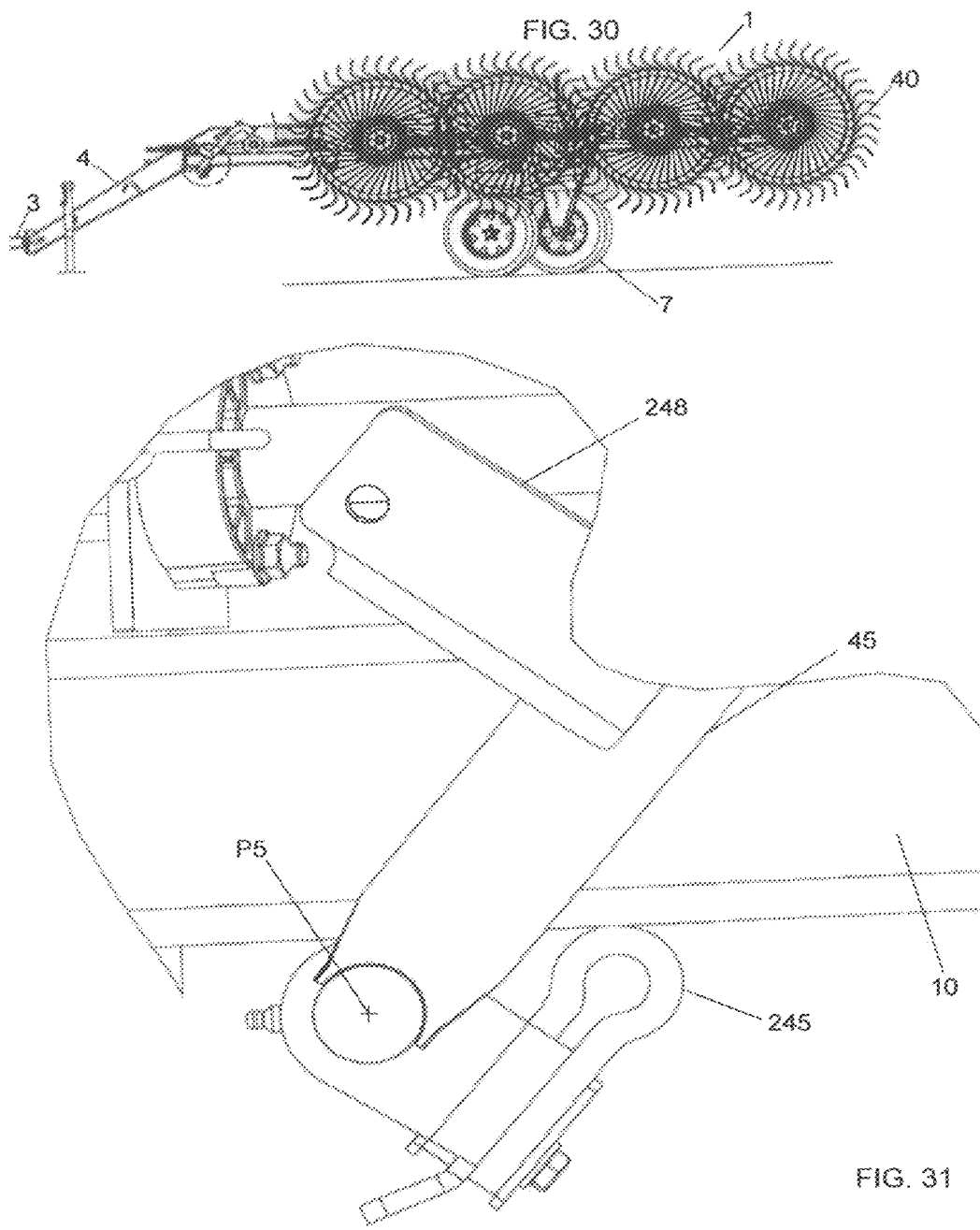

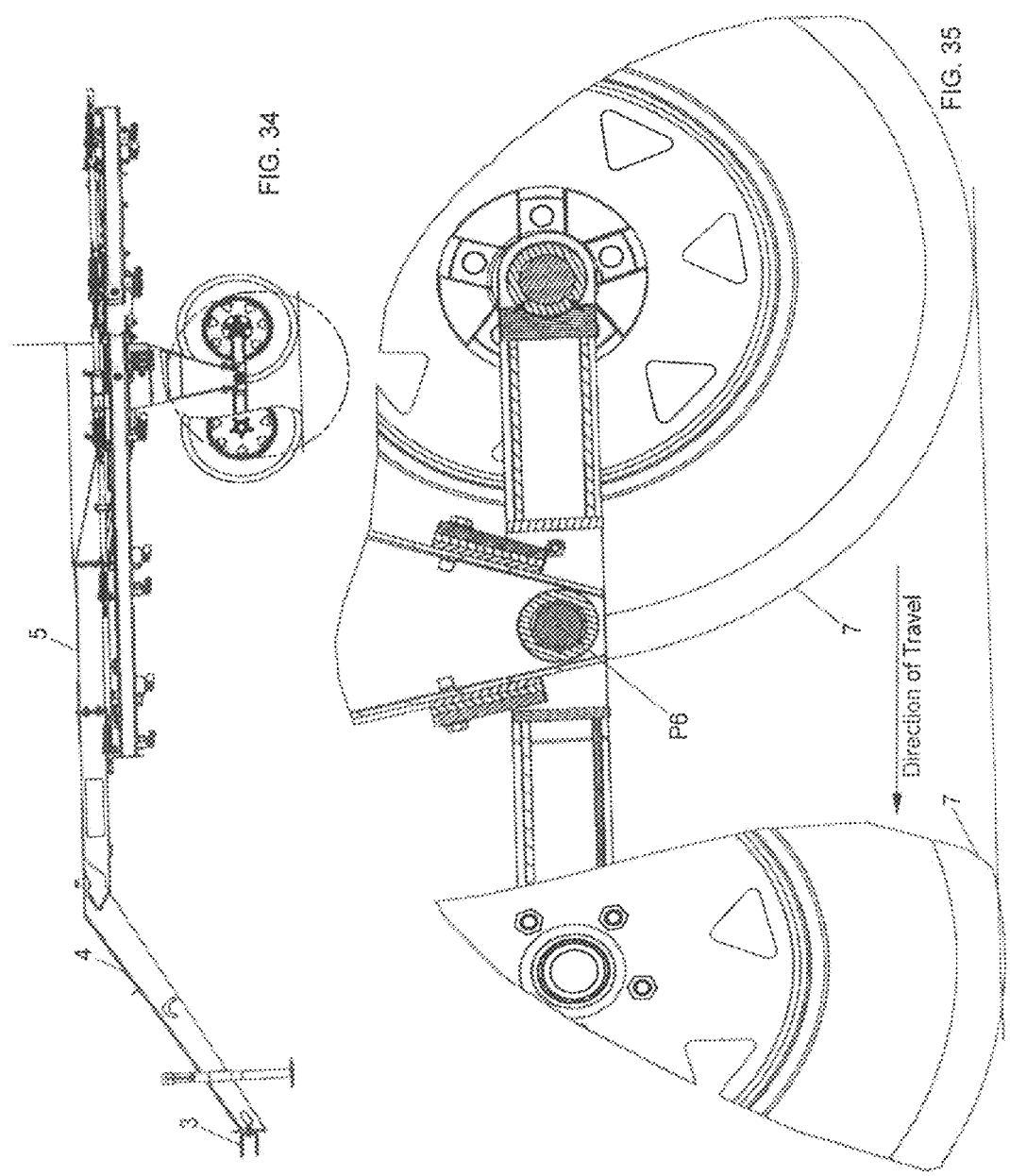

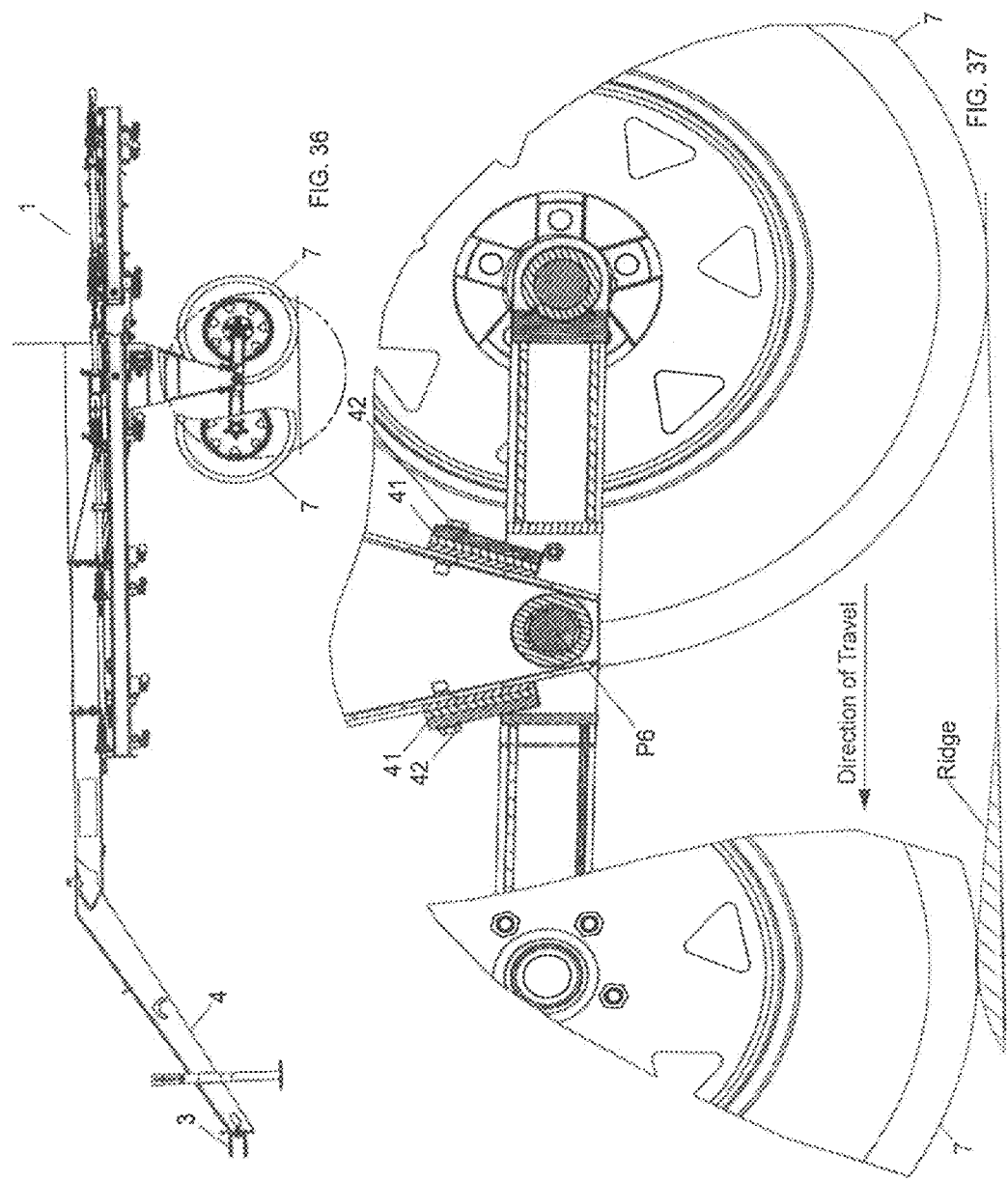

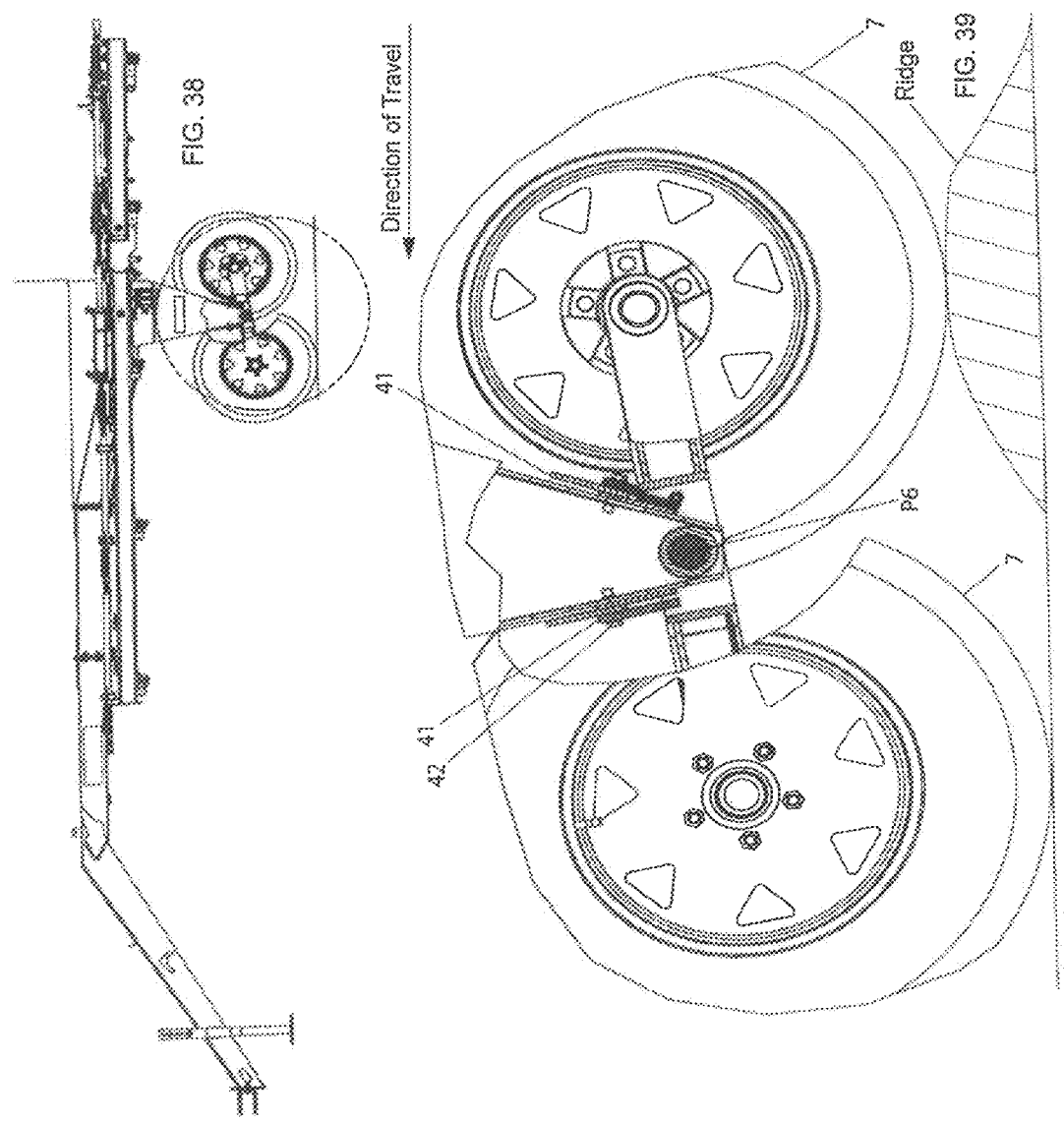

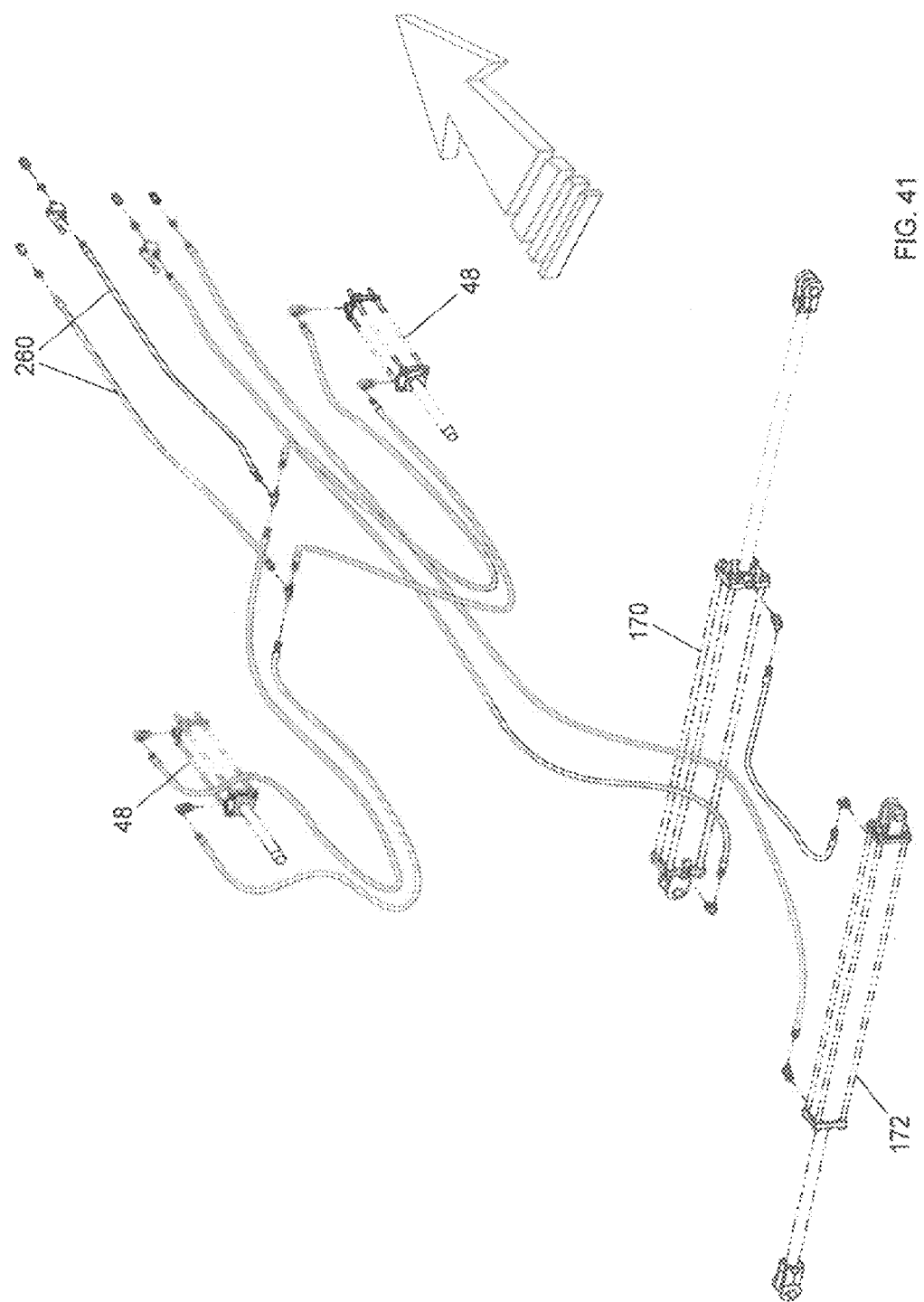

ADJUSTABLE RAKE FOR FEED MATERIAL WITH MULTIPLE WIDTH ADJUSTMENT

BACKGROUND OF THE INVENTION

1. Field of the Invention

This invention relates to agricultural rakes such as carted or folded hay rakes used to form windrows from cut crops. For example, the rakes may be used to form windrows from cut hay, straw, and/or grasses.

2. Description of the Related Art

Folding hay rakes have been used to form windrows from cut crops for many years. One example of a folding hay rake is a "V" rake that generally has a wide opening at the top of the V and includes multiple rake wheels along the arms of the V that form a windrow at the narrow part of the V, which is typically downstream (to the rear) with respect to the direction of travel of the hay rake.

In order to transport V-shaped rakes such as the one noted above, the rakes typically fold into a transport position that is narrower than the work position (raking position) by either folding vertically and/or folding about a vertical axis, which makes the V narrower or sharper as viewed from above. The transport position is typically sufficiently narrow to fit on a roadway, and preferably, substantially within a single lane of a roadway.

It is beneficial to be able to adjust the width of the wide part of the V (top of the V) as well as to be able to adjust the width of the narrow part of the V (bottom of the V).

Additionally, it is beneficial to be able to rake the interior portion of the V, i.e. the part where the final windrow is deposited. One benefit of raking the interior of the V is that material in this area is overturned for drying, even though the material may end up roughly in the same place it was before being raked. When raking mechanisms for raking the interior of the V are included with an adjustable hay rake, it is often beneficial to configure these interior rake wheels or "splitter" wheels to move inward and outward relative to a central, longitudinal axis of the rake in order to accommodate other adjustments in the rake or to alter the area raked by these interior rakes.

SUMMARY OF THE INVENTION

One example of the invention provides an adjustable rake for raking agricultural products including a wheeled cart configured to be pulled in a direction of travel on a surface of travel and first and second rake arm positioners coupled to the wheeled cart and configured to translate in a direction transverse to the direction of travel of the wheeled cart. First and second front rake arm assemblies are pivotably coupled to the first and second rake arm positioners, respectively. First and second inner supports are included, and each of the first and second inner supports is pivotably coupled to the wheeled cart and is configured to pivot as a result of translation of the first and second rake arm positioners in the direction transverse to the direction of travel of the wheeled cart. The rake may include optional splitter wheels disposed near a central member.

One aspect of the invention provides an adjustable rake for raking agricultural products including a central member supported by at least one wheel and configured to be pulled forward in a direction of travel on a surface of travel, a longitudinal axis of the adjustable rake extending through the central member and along the direction of travel. This aspect further includes first and second rake arm assemblies coupled to the central member and configured to move toward and away from the longitudinal axis in a direction transverse to the direction of travel of the central member such that, after the first and second rake arm assemblies have moved toward the longitudinal axis, respective front ends of the first and second rake arm assemblies are disposed at a first distance from each other, and after the first and second rake arm assemblies have moved away from the longitudinal axis, the respective front ends of the first and second rake arm assemblies are disposed at a second distance from each other different from the first distance. This aspect further includes at least one inner support that controls a distance between rear ends of the first and second rake arm assemblies such that the distance between rear ends of the first and second rake arm assemblies is approximately the same while the fronts of the first and second rake arm assemblies are disposed at the first distance as when the fronts of the first and second rake arm assemblies are disposed at the second distance.

Another aspect of the invention relates to an agricultural rake comprising a central member supported by at least one wheel and configured to be pulled forward in a direction of travel on a surface of travel, a longitudinal axis of the adjustable rake extending through the central member and along the direction of travel. This aspect includes a first rake assembly coupled to the central member, a second rake assembly coupled to the central member, a first plurality of first rake wheels coupled to the first rake assembly, a second plurality of second rake wheels coupled to the second rake assembly, and at least first and second splitter rake wheels coupled to the central member and configured to move toward and away from the central member in response to movement of an actuator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a top view of the adjustable rake depicted in FIG. 1;

FIG. 3 is a top view of the rake depicted in FIG. 1, but with a section of detail identified;

FIG. 4 is the detail view identified in FIG. 3;

FIG. 5 is a top view of the rake depicted in FIG. 1, but with the rear arms adjusted to be at different distances from a center line of the rake;

FIG. 10 is an alternate embodiment of the rake depicted in FIG. 1 and including yet another adjustment mechanism;

FIG. 11 is a partial perspective view of the rake depicted in FIG. 1 and identifying an area for a detailed view;

FIG. 12 depicts the full area of the detailed view shown in FIG. 11;

FIG. 13 is a top view of the rake depicted in FIG. 5, but with internal devices shown for adjusting the arms of the rake;

FIG. 23 is a lower perspective view of the mechanism used to move the splitter wheels of FIG. 19, but with one of the splitter wheels removed for clarity;

FIG. 26 depicts the arrangement shown in FIG. 24, but in a wide position rather than a narrow position as shown in FIG. 25;

FIG. 28 is a side view of the rake shown in FIG. 1 with the rake arms in a "down" position;

FIG. 29 is an enlarged view of an area of detail depicted in FIG. 28;

FIG. 30 is a side view of the transport position of the rake wheels;

FIG. 31 is an enlarged view of an area of detail shown in FIG. 30;

FIG. 34 is a side view of a tandem wheel arrangement attachable to the rake depicted in FIG. 1;

FIG. 35 is an enlarged view of an area of detail depicted in FIG. 34;

FIG. 36 is a side view of the tandem wheel arrangement depicted in FIG. 34, but in transition as the wheels pass over a ridge or hill, and demonstrates a restriction to the extent of movement available to the wheels;

FIG. 37 is an enlarged view of an area of detail depicted in FIG. 36;

FIG. 38 is a side view of the tandem wheel arrangement depicted in FIGS. 34 and 36, but slightly later in time as the wheels pass over the ridge or small hill, and this view shows the wheels with an increased amount of movement;

FIG. 39 is an enlarged view of an area of detail depicted in FIG. 38;

FIG. 41 is a view of an alternate arrangement for controlling fluid cylinders as depicted in FIG. 1.

DETAILED DESCRIPTION OF THE PREFERRED EMBODIMENTS

Figure 1:
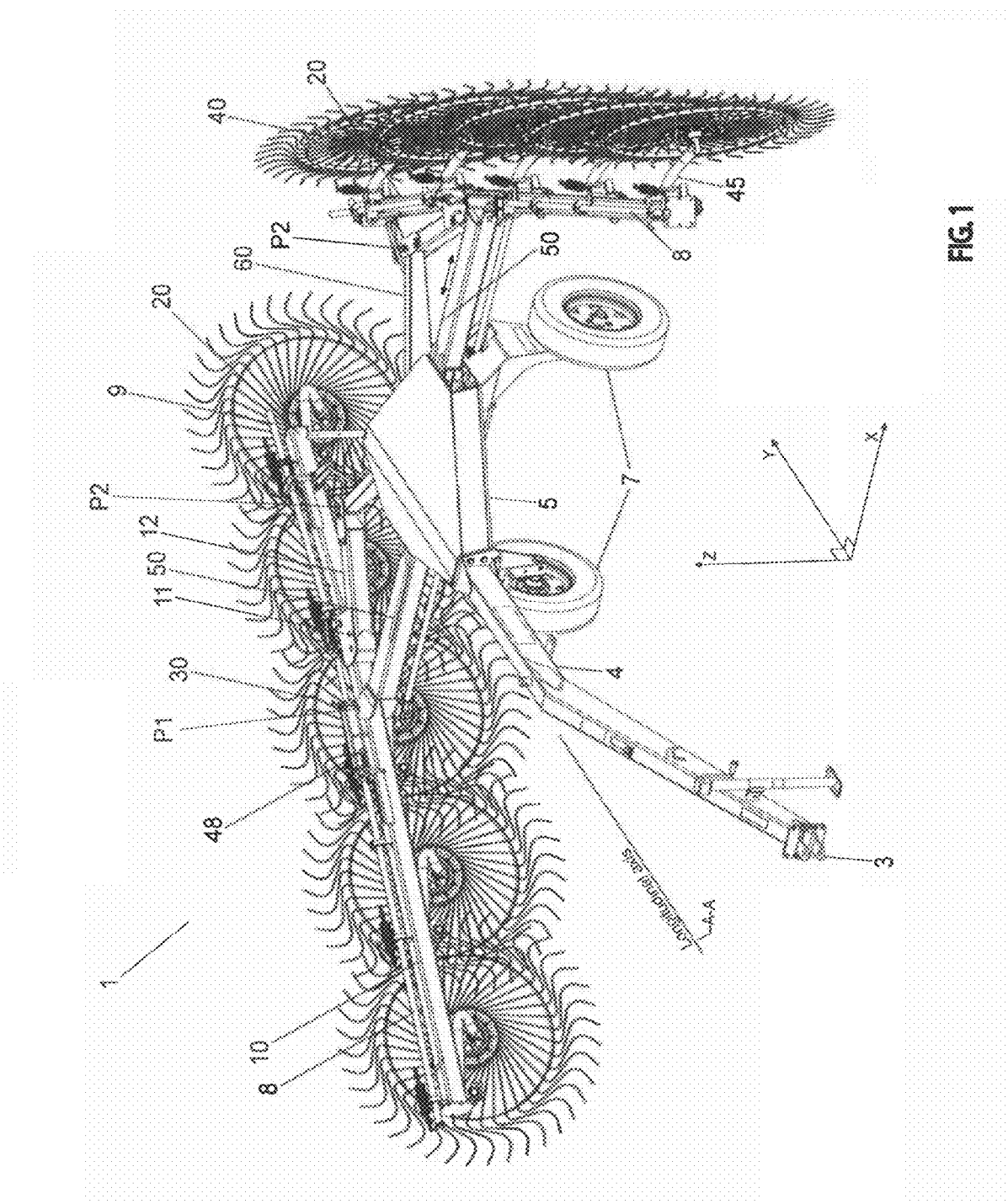
FIG. 1 is a perspective view of one example of an adjustable rake according to the invention.

Referring now to the drawings, wherein like reference numerals designate identical or corresponding parts throughout the several views.

FIG. 1 is a perspective view of one example of an adjustable rake 1 according to one example of the present invention. The adjustable rake generally travels forward in the direction of the widest part of the "V" shape formed by the various arms of the rake. In other words, based on the coordinate system shown in FIG. 1, the rake travels in the negative Y direction where Y is in the X-Y plane of the flat surface of the ground on which the rake travels.

The adjustable rake 1 includes a front rake arm assemblies 10 on which rake wheel arms 45 are disposed. The rake wheel arms 45 typically pivotably connect rake wheels 40 to the front rake arm assemblies. Similarly, the rake wheel arms 45 connect rake wheel arms 40 to a rear rake arm assemblies 20. In some embodiments, the rake wheel arms 45 each connect two or more rake wheels 40 to the respective front and rear rake arm assemblies 10 and 20. In other embodiments, each rake wheel arm 45 connects only a single rake wheel 40 to the respective rake arm assembly to which the rake wheel arm 45 is attached. In either the single or multiple rake wheel arrangement, or in any combination of single and multiple rake wheel arrangements, the rake arms 45 and rake wheels 40 may be disposed on either side of the front rake arm assembly 10 and rear rake arm assembly 20 to which they are attached. In other words, in terms of the V shape, the single or multiple rake arms 45 and rake wheels 40 in any of the embodiments described herein may be disposed on the inside of the V, on the outside of the V, or on both sides of the V.

The adjustable rake 1 typically includes one front rake arm assembly 10 on each side of a cart 5. The cart 5 is configured to be pulled in a direction of travel. The adjustable rake 1 also typically includes one rear rake arm assembly 20 on each side of the cart 5. The cart typically acts as a hub for connecting the various rake arm assemblies to a tongue 4 which is in turn couplable to a vehicle such as a tractor or truck. In other words, the various rake arm assemblies are all directly or indirectly coupled to the cart 5 and are ultimately pulled in the direction of travel via the tongue 4. In the depicted example, the tongue 4 connects to the vehicle via a hitch 3. Various examples of this hitch arrangement are depicted in U.S. Pat. Nos. 7,318,312 and 7,328,567, the entire contents of each of which as well as the contents of U.S. Pat. No. 7,584,595, are hereby incorporated herein by reference.

The cart 5 is typically supported by one or more transport wheels 7 as shown in FIG. 1. In an alternate arrangement, the transport wheels 7 can be arranged in a tandem axle arrangement as depicted in FIGS. 34-39. In either case, the transport wheels 7 support the cart on a surface of travel such as a road or field and allow the cart 5 to be pulled in a direction of travel perpendicular to an axis of rotation of a transport wheel 7. The various rake arm assemblies 10 and 20 are typically coupled to the cart 5 via at least one rake arm positioner 50. As shown in FIG. 1 and FIG. 2, each rake arm positioner 50 typically protrudes outward from the cart 5 and pivotably couples to the front rake arm assembly 10 and rear rake arm assembly 20.

As shown by the double arrows in FIGS. 1 and 2, the rake arm positioner 50 can extend farther from the cart 5 by moving inward or outward. Typically, the inward or outward movement of the rake arm positioner 50 is perpendicular or substantially perpendicular to the direction of travel of the adjustable rake 1. In other words, based on the coordinate system shown in FIG. 1, the rake arm positioners 50 typically move parallel or substantially parallel to the X axis. However, deviations from this direction can be made depending on the linkages involved in connecting the rake arm positioners 50 to the cart 5. For example, the rake arm positioners 50 may extend upward (in the Z direction) or forward or backward (in the Y direction).

Also coupled to the cart 5, as shown in FIGS. 1 and 2, are the inner rear supports 60, which pivot as shown by the double arrows shown in FIG. 2. As the rake arm positioners 50 contract (move inward toward the cart 5), the inner rear supports 60 typically move toward the rear of the adjustable rake 1 (top of the drawing as shown in FIG. 2). In other embodiments (not shown), the inner rear supports 60 may be disposed in front of the rake arm positioners 50, i.e., in a mirror-image arrangement of the configuration shown in FIG. 2. As shown in FIG. 2, the inner rear supports 60 are pivotably coupled to a front rake arm assembly extension 12 via pivot point P2. The pivot point P2 may be a pin, bearing, bolt, or other pivotable arrangement. The front rake arm assembly extension 12 extends from the pivot point P2 to a plate 11 rigidly connecting the front rake arm assembly extension 12 to the remainder of the front rake arm assembly 10. In other examples, the front rake arm assembly extension 12 is integrally formed with the front rake arm assembly 10 or is welded or otherwise rigidly connected to the front rake arm assembly 10.

The inner rear support 60 is typically coupled to the rear rake arm assembly via an adjustment link 120 as shown in FIGS. 2 and 4.

FIG. 4 depicts an enlarged view of the section of detail shown in FIG. 3. As shown in FIG. 4, the adjustment link 120 couples to the adjustment bracket 100 via any of the adjustment holes 110. By using the adjustment holes 110, an operator may move the adjustment link 120 to alter the angle of the rear rake arm assembly relative to the direction of travel of the cart 5. By changing the hole by which the adjustment link 120 is coupled to the rear rake arm assembly 20, the operator can change the distance between the end of the rear rake arm assembly 20 and the center line (typically the Y axis starting from the center line of the cart 5 and passing through the tongue 4). Thus, via this adjustment, the operator can adjust the width of the windrow formed by the adjustable rake 1 independently of the width of the wide part of the V (forward-most part of the V) formed by the front rake arm assemblies 10. Said differently, the operator may widen or reduce the width of the front rake arm assemblies 10 without changing the width of the narrow part of the V that determines the width of the windrow. One benefit of this arrangement is that, for a particular angle of attack of the various arms of the V, the windrow width may be adjusted without changing the angle of attack. Alternatively, the angle of attack of the various arms of the V may be adjusted without changing the width of the windrow, depending on the preferences of the operator. As shown in FIG. 4, the adjustment link 120 is typically connected via adjustment link pivots 125 and 126 to the inner rear support 60 and the adjustment bracket 100, respectively.

As shown in FIG. 5, in an operating system, the distance from the rearmost ends of the rake wheels 40 at the end of the adjustable rake 1 may be X1 and X2 as measured from a center line of the cart 5 during a working position. The sum of X1 and X2 is substantially equal to the width of the windrow formed by the adjustable rake 1. The front part of the rake will have a wider distance than the rear part of the rake, and a distance between a front part of the frontmost rake wheel 40 touching the ground and a center line of the cart 5 on one side of the rake may be V1 while the distance on the other side is V2. Thus, during the working position, the various arms of the adjustable rake 1 may each have a different distance to a center line of the cart 5. In this regard, reference is made to the center line of the cart 5. However, the distance is described in this way for convenience and may be taken with respect to a different point of reference such as a center of the tongue 4 or a mid-way point between transport wheels 7.

Figure 6:
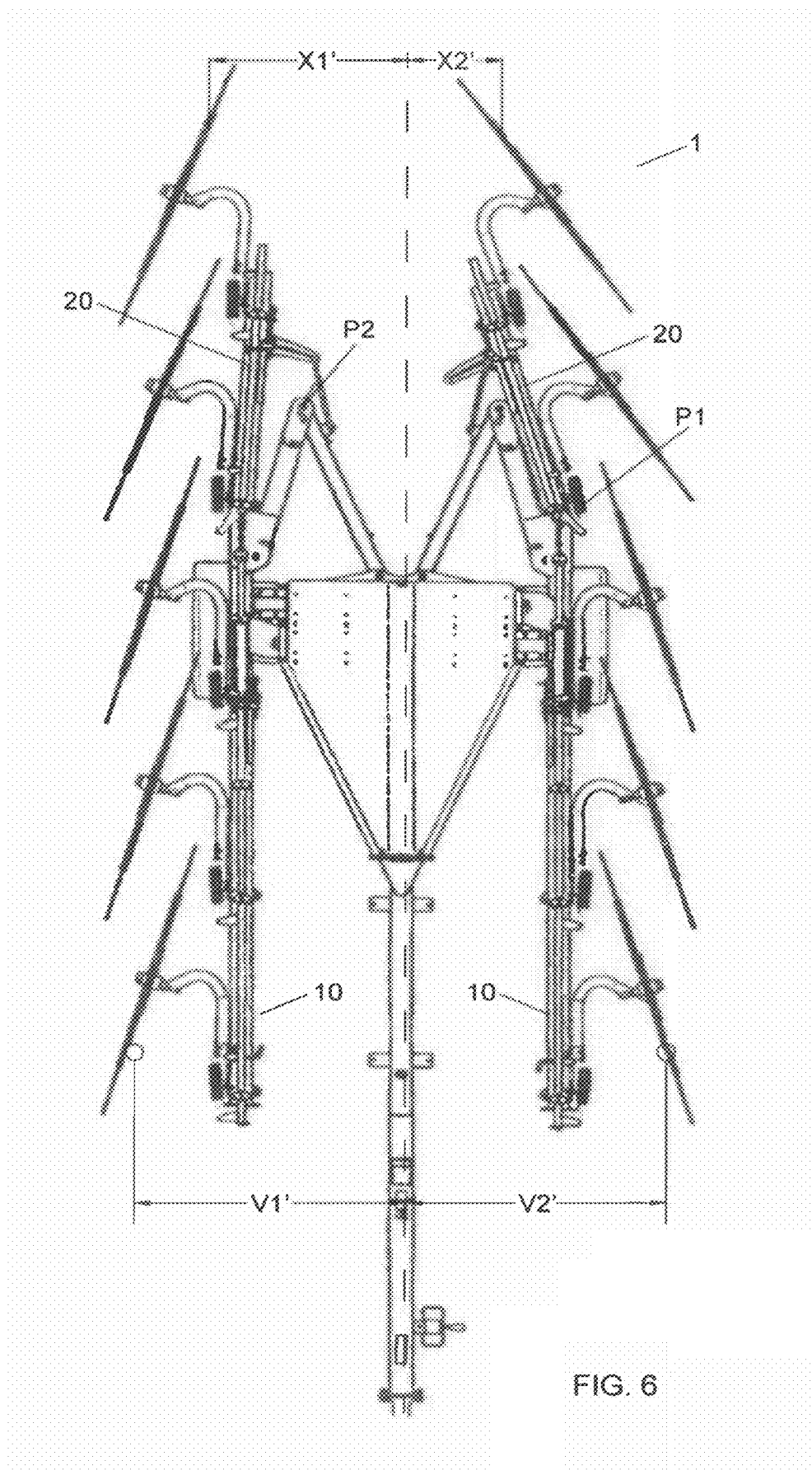
FIG. 6 is a top view of the rake depicted in FIG. 5, but with the arms in a transport position.

FIG. 6 depicts the rake shown in FIG. 5, but with the distances between the rake arm changed to X1', X2', V1', and V2'. As is apparent from a comparison of FIG. 6 with FIG. 5, the distances X1 and X1' are substantially equal, and the distances X2 and X2' are also substantially equal. However, the distances V1 and V1' are quite different as are the distances V2 and V2'. In other words, the position of the front part of the V of the adjustable rake 1 has changed greatly while the position of the rear part of the V (bottom of the V) has not changed or has changed very little. In one example, the distance X1 is 35.70 inches, and the distance X1' is 35.72 inches. Similarly, in one example, the distance X2 is 20.25 inches, and the distance X2' is also 20.25 inches. In the above-noted examples, V1 is 125.03 inches, and V2 is also 125.03 inches. V1' and V2' are each 48.9 inches. Thus, it is apparent that the width of the opening of the V can be changed while leaving the width of the windrow formed by the rear of the adjustable rake 1 at a substantially constant dimension. In regard to the term "substantially equal" or "substantially constant," these terms mean within 5%. Furthermore, as is evident in a comparison between FIGS. 5 and 6, the adjustment link 120 on each side of the adjustable rake 1 is coupled to the same adjustment holes 110 in both figures. Thus, no manual adjustment is necessary in order to maintain the distances X1 and X2 between the arrangements shown in FIGS. 5 and 6. Rather, this distance automatically remains constant, even as the front rake arm assemblies 10 change angles. In other words, the angle between the front rake arm assemblies 10 and the rear rake arm assemblies 20 changes automatically as a result of translation of the rake arm positioners 50. One benefit of this arrangement is that the width of the windrow formed by the rear rake arm assemblies 20 can be adjusted (or set) independently of the position of the rake arm positioners 50, which means that the width of the windrow can be set independently of the angular position of the front rake arm assemblies 10 forming the top of the V of the rake. Additionally, the rake width can be adjusted without stopping, and the windrow width will remain the same.

Figure 7:
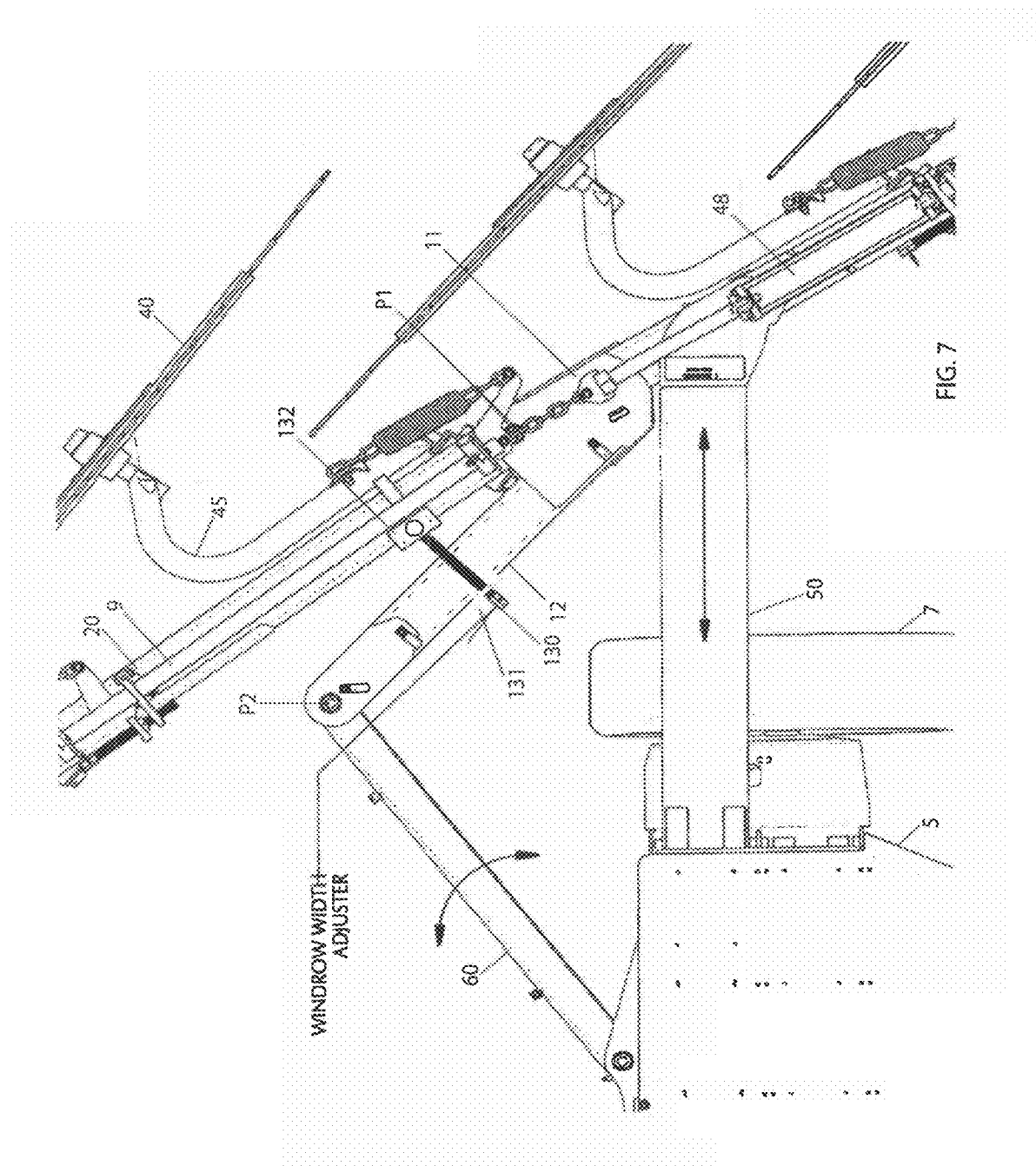
FIG. 7 is a partial top view of an alternative embodiment of the rake depicted in FIG. 1 and including a different rear arm adjustment mechanism.

FIG. 7 depicts a detailed top view of an alternate embodiment of a means for independently adjusting the rear or bottom part of the V of the adjustable rake 1. In contrast to the embodiment shown in FIGS. 5 and 6, FIG. 7 provides a windrow width adjuster bolt 130 that is threadable between relatively open and relatively closed positions through a dog leg 131 and bearing 132 coupled to the rear rake arm assembly 20. By threading the windrow width adjuster bolt 130 inward or outward, the rear rake arm assembly will change angles, and the rearmost end of the rear rake arm assembly 20 will move toward or away from a center line of the adjustable rake 1. In this manner, the width of the windrow may be independently adjusted. One benefit of the arrangement depicted in FIG. 7 over the arrangement depicted in FIGS. 5 and 6 is that the rear rake arm assembly can be adjusted in very fine increments. In fact, along the length of the adjuster bolt 130, the width of the windrow is infinitely adjustable. In this embodiment, the angle between the rear rake arm assembly 20 and front rake arm assembly 10 remains constant. In other words, the front and rear rake arm assemblies are locked to each other.

Figure 8:
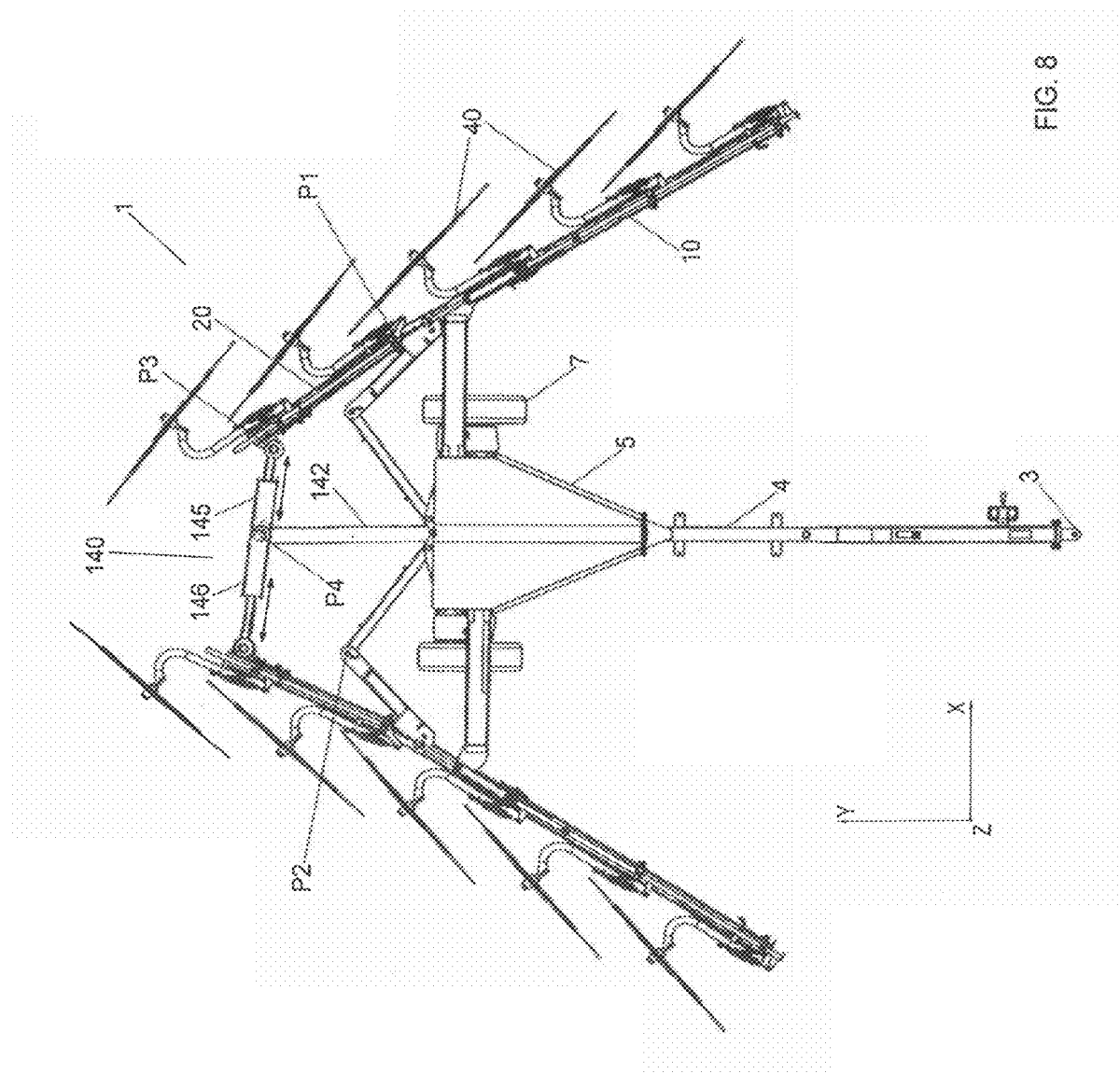
FIG. 8 is a top view of an alternative embodiment of the rake depicted in FIG. 1 including yet another adjustment mechanism.

FIG. 8 is a top view of an alternate arrangement for independently adjusting the rear rake arm assemblies 20. This embodiment also provides for a constant windrow width, regardless of the raking width. In the example shown in FIG. 8, a cross-connection 140 connects two transverse members 145, 146 to respective rear rake arm assemblies 20. A longitudinal member 142 couples to the two transverse members 145, 146 at a pivotable joint P4. Typically, the transverse members 145, 146 are adjustable in the horizontal direction (in length) as shown in FIG. 8 by the double headed arrows adjacent to the transverse members 145, 146. In other words, the length of the transverse members 145, 146 is typically adjustable. For example, the transverse members 145, 146 may comprise one or more turnbuckles. As shown in the previous embodiments, the rear rake arm assemblies 20 pivot relative to the front rake arm assemblies 10 via a pivot point P1. Thus, the angle of the rear rake arm assemblies 20 relative to the front rake arm assemblies 10 may be changed independently of the angle of the front rake arm assemblies 10 relative to the center line of the adjustable rake 1.

Figure 9:
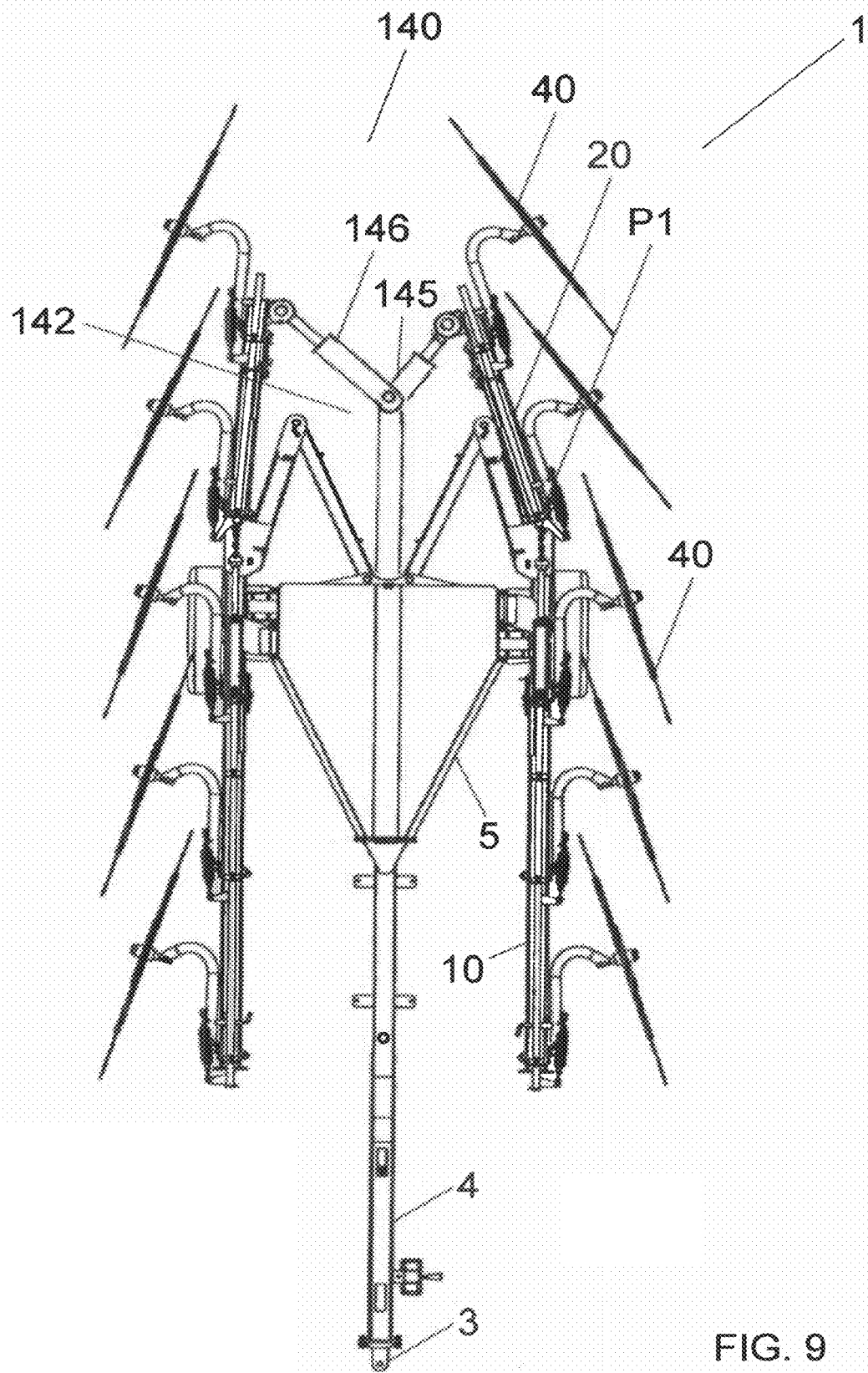
FIG. 9 is a top view of the rake depicted in FIG. 8, but with the arms in the transport position.

FIG. 9 depicts the example described in FIG. 8 in a position in which the adjustable rake 1 has been placed in the transport position, which is narrower than the working position. When the adjustable rake 1 is returned to the working position, the rear rake arm assemblies 20 will return to the position shown in FIG. 8. The distance between the rear rake arm assemblies 20 can typically be adjusted by an operator by threading, bolting and rebolting, unpinning and pinning, or otherwise mechanically changing the length of the transverse members 145, 146. Additionally, the length of each of the transverse members may be independently adjustable. In other words, the length of one of the transverse members 145, 146 may be changed without changing the length of the other of the transverse members 145, 146. In some cases, the transverse members 145, 146 and longitudinal member 142 may be removable from the position shown in FIGS. 8 and 9 and stored within the cart 5 or in another location. In some cases, the cross-connection 140 includes a turn-buckle in place of the transverse members 145, 146, and the turn-buckle threads in order to adjust the distance between the rear rake arm assemblies 20. The longitudinal member 142 acts as a stabilizer for the rear rake arm assemblies 20 and typically removably couples to the cart 5. However, the longitudinal member 142 may be rigidly fixed to the cart 5 or another portion of the support structure of the adjustable rake 1.

FIG. 10 shows an alternate embodiment of an arrangement used to independently adjust the distance between the rear rake arm assemblies 20. This embodiment also provides for a constant windrow width, regardless of the raking width. In this example, a Y-connection 150 includes Y-members 156, each of which is pivotably coupled at one end to the cart 5 and at the other end to one of the two rear rake arm assemblies 20. As shown by the arrows adjacent to the Y-members 156, the length of the Y-members 156 may be adjusted, which is similar to the adjustment made to the transverse members 145, 146 shown in FIG. 8. Thus, the Y-members 156 may comprise one or more turnbuckles. In the embodiment depicted in FIG. 10, the Y-members 156 are directly connected between the rear rake arm assemblies 20 and the cart without requiring a longitudinal member. As discussed above, the length of the Y-members 156 may be adjusted by threading, a pin and multiple hole arrangement, bolting, or other such arrangements, and the length of each of the Y-members 156 is typically individually adjustable, irrespective of the length of the other of the Y-members 156. One benefit of the arrangement of the Y-connection shown in FIG. 10 is that, because of the direct connection between the rear rake arm assemblies 20 and the cart, which is roughly tangent to the arc formed by motion of the rear rake arm assemblies 20 as they pivot about pivot P1, the Y-members 156 are typically mechanically advantaged to deal with the forces presented by motion of the adjustable rake 1 in the forward direction, and therefore, the Y-members 156 can typically be made lighter than with other arrangements.

FIGS. 11 and 12 depict the configuration for the pivot point P2 about which the front rake arm assembly extension 12 pivots relative to the inner rear support 60. As shown in FIG. 12, a shim S may be disposed between the bushing connecting the front rake arm assembly extension 12 to the inner rear support 60 in order to lift or lower the front rake arm assembly extension. In other words, the shim S and bushing together act as a biasing device that increases or reduces force on the front rake arm assemblies. By lifting or lowering the front rake arm assembly extension, an angle or vertical position of the front rake arm assembly relative to the ground can be adjusted. By adjusting this angle, (in a free standing state), user-specified amounts of pressure may be placed on the various rake wheels 40 disposed along the length of the front rake arm assembly 10. In other words, the load placed on the rake wheels 40 may be changed by changing the shim S. Thus, based on the preferences of the operator, the amounts of loading placed on the front and rear portions of the front rake arm assemblies 10 via the biasing device can be optimized. For example, by adjusting the pressure created by the shim S, the rake wheels 7, when used in a tandem arrangement such as depicted in FIG. 37, can be made to move up and down together or mostly together when encountering a dip, trench, or bump. In other words, when encountering a dip or trench, the forward-most wheel will be supported as a cantilever over the trench while the following wheel (second wheel) supports that part of the rake 1. Then, when the forward-most wheel passes by the trench, the following wheel is held as a cantilever while the forward-most wheel supports that portion of the rake 1. Alternatively, the shim S could be set such that the forward-most wheel dips down into the trench, i.e., follows the contour of the ground with less cantilever effect than described above. Thus, the shim S allows the operator flexibility in setting his preferred configuration for the extent to which the rake wheels 7 follow the contour of the ground.

FIG. 13 depicts an internal mechanical system disposed within the cart 5 for moving the rake arm positioners 50 inward and outward. In the arrangement shown in FIG. 13, first and second fluid cylinders 170, 172 push and pull the rake arm positioners 50 inward and outward. The fluid cylinders 170, 172 are typically hydraulic cylinders, but may be pneumatic cylinders or another type of linear actuator if desired. The rake arm positioners 50 are typically pivotably connected to the front rake arm assemblies 10. Thus, by controlling the length of stroke of the first and second fluid cylinders 170, 172, the operator controls the width of the top part of the V, which is the forward part of the V of the adjustable rake 1. In the embodiment shown in FIG. 13, the distances VV1 and VV2 can be changed by changing the length of the cylinders 170, 172 by adding or removing fluid from one side of a piston in each of the cylinders 170, 172. Fluid connections for controlling the cylinders 170, 172 are described in FIGS. 40 and 41 and will be discussed later.

Figure 14:
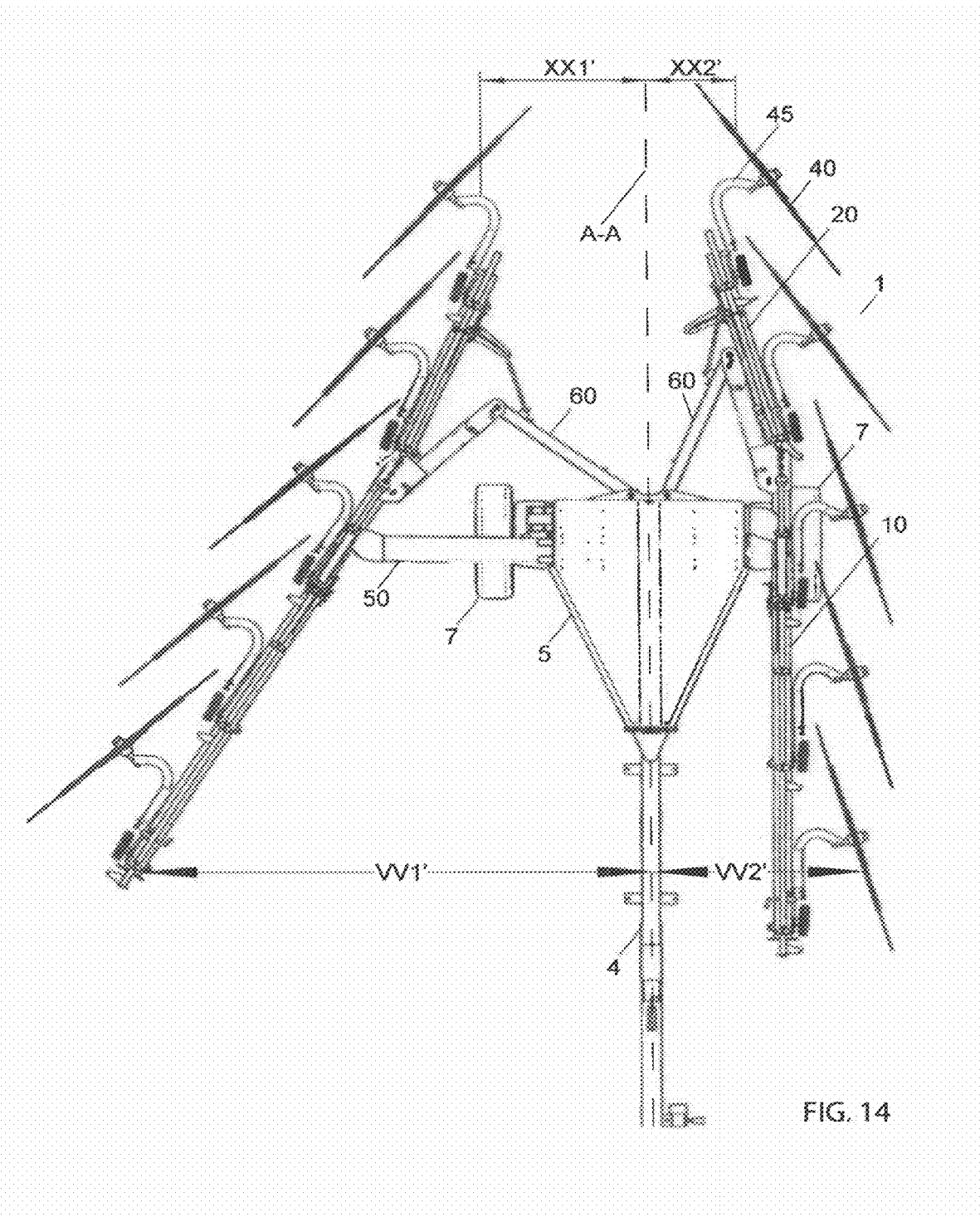
FIG. 14 depicts the rake shown in FIG. 13 with one arm disposed at the same distance shown in FIG. 13 and another arm shown at a different distance than shown in FIG. 13.

FIG. 14 depicts the example shown in FIG. 13 with one side (the right side of FIG. 13) of the adjustable rake 1 disposed in a transport position. In other words, the rake arm positioner 50 on the right hand side of the adjustable rake shown in FIG.

14 is contracted most, if not all of the way into the cart 5. As further shown in FIG. 14, by comparison with FIG. 13, the distances VV1, VV2, XX1, and XX2 have all changed. Therefore, not only is the bottom part of the V (rear part of the adjustable rake 1) adjustable with respect to the top part of the V (forward part of the adjustable rake 1), the right hand parts of each of the front and rear parts of the adjustable rake 1 are adjustable independently of the left hand parts.

It is often beneficial to be able to actuate one side of the adjustable rake 1 independently of the other side of the adjustable rake 1 in order to rake small areas of cut material or to flip one row of crop without combining it with the other. Accordingly, depending on the actuation system used to move the rake arm positioners 50, the independent movement of one side of the adjustable rake 1, for example, the right-hand side, may be achieved by isolating one of the fluid cylinders 170, 172 from the device providing fluid inputs, i.e, the fluid pump providing pressurized fluid. This isolation is typically performed via a valve box that controls distribution of fluid to the fluid cylinders, and the valve box may be located on the adjustable rake 1 or in another location, such as in the cab of the tractor or truck used to pull the adjustable rake 1.

Figure 15:
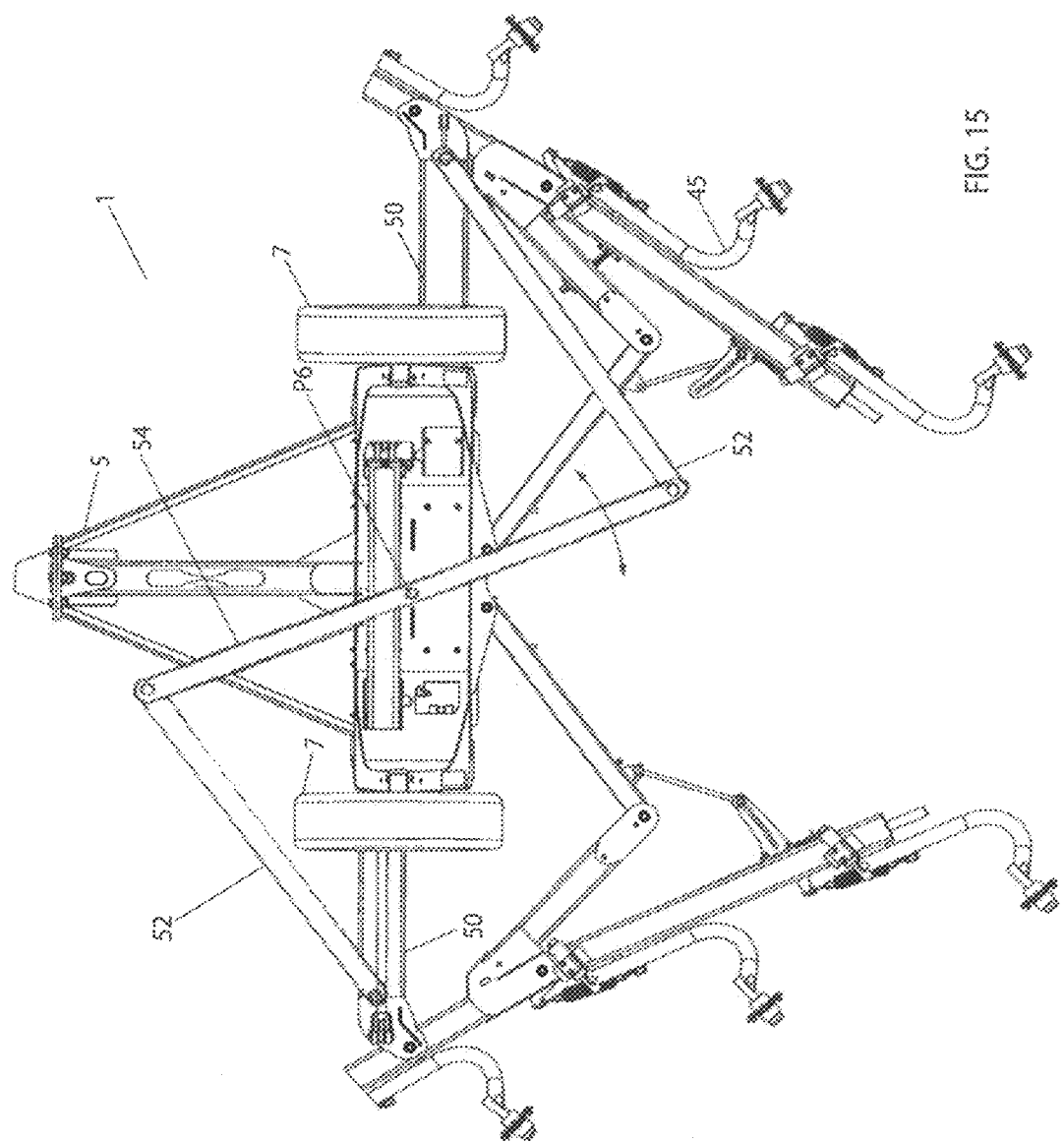
FIG. 15 depicts an alternate embodiment of the rake shown in FIG. 13 with a cylinder that moves one rake arm positioner and a central rotating member that couples the rake arm positioners so as to move the rake arm positioners simultaneously.
Figure 16:
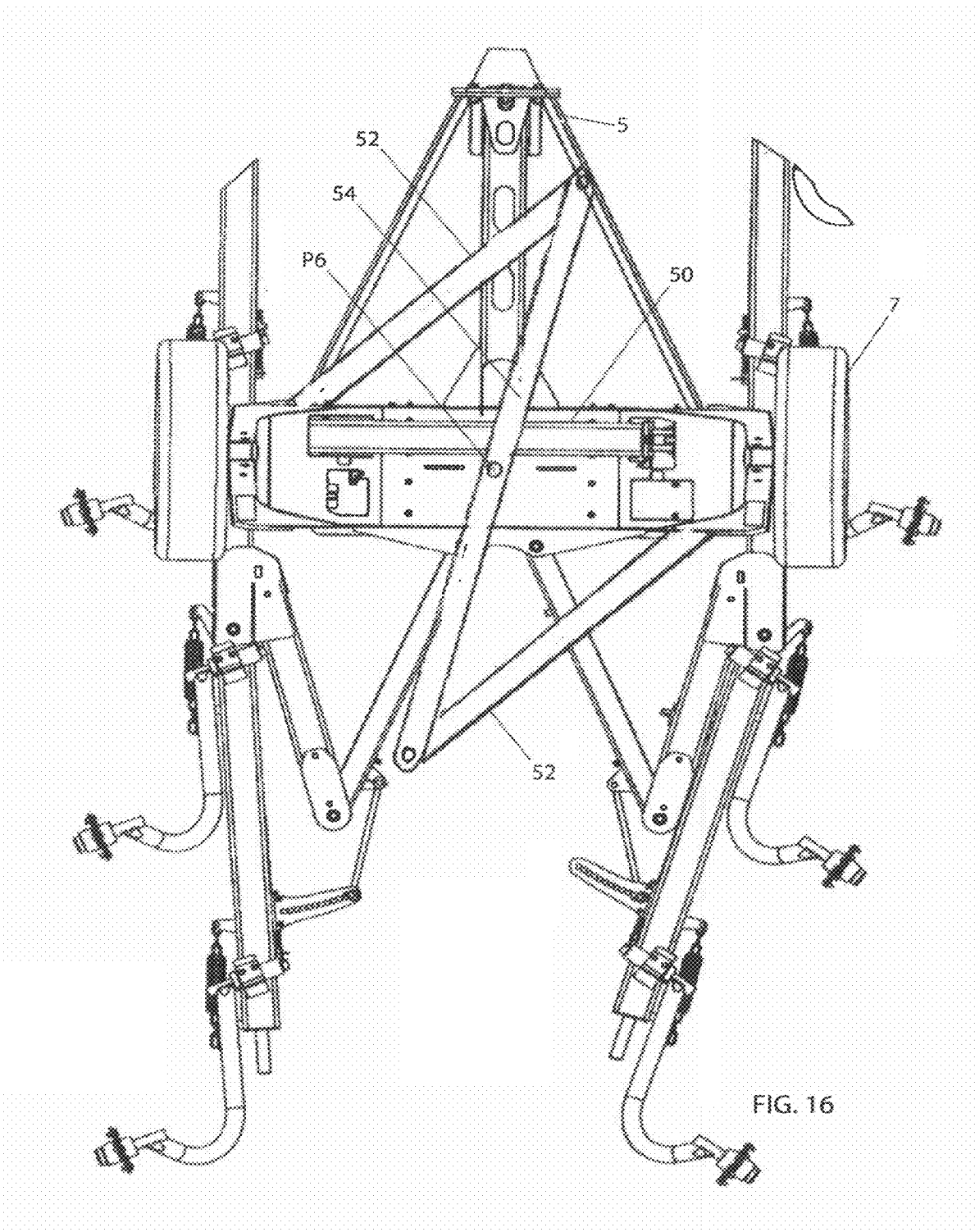
FIG. 16 depicts the example shown in FIG. 15, but in a closed position, such that the rake is convenient for transport on a roadway.

FIGS. 15-16 depict an alternate arrangement of the rake arm positioner configuration shown in FIG. 14. As shown in FIG. 15, a central rotational member 54 rotates around a pivot point P6 connected to the cart 5. In FIG. 15, which is a bottom view of the adjustable rake 1, the rotational member 54 is pivotably coupled to connecting members 52, which are in turn pivotably coupled to the rake arm positioners 50, respectively. A cylinder (not shown in FIGS. 15-16) moves one rake arm positioner 50, which movement rotates the central rotational member 54. The rotation of the central rotational member 54 moves the other rake arm positioner 50. Thus, both rake arm positioners move in response to the change in length (extension or retraction) of the cylinder. Accordingly, the adjustable rake 1 is placed in the transport position or working position based on a change in length of one hydraulic or pneumatic cylinder.

Figure 17:
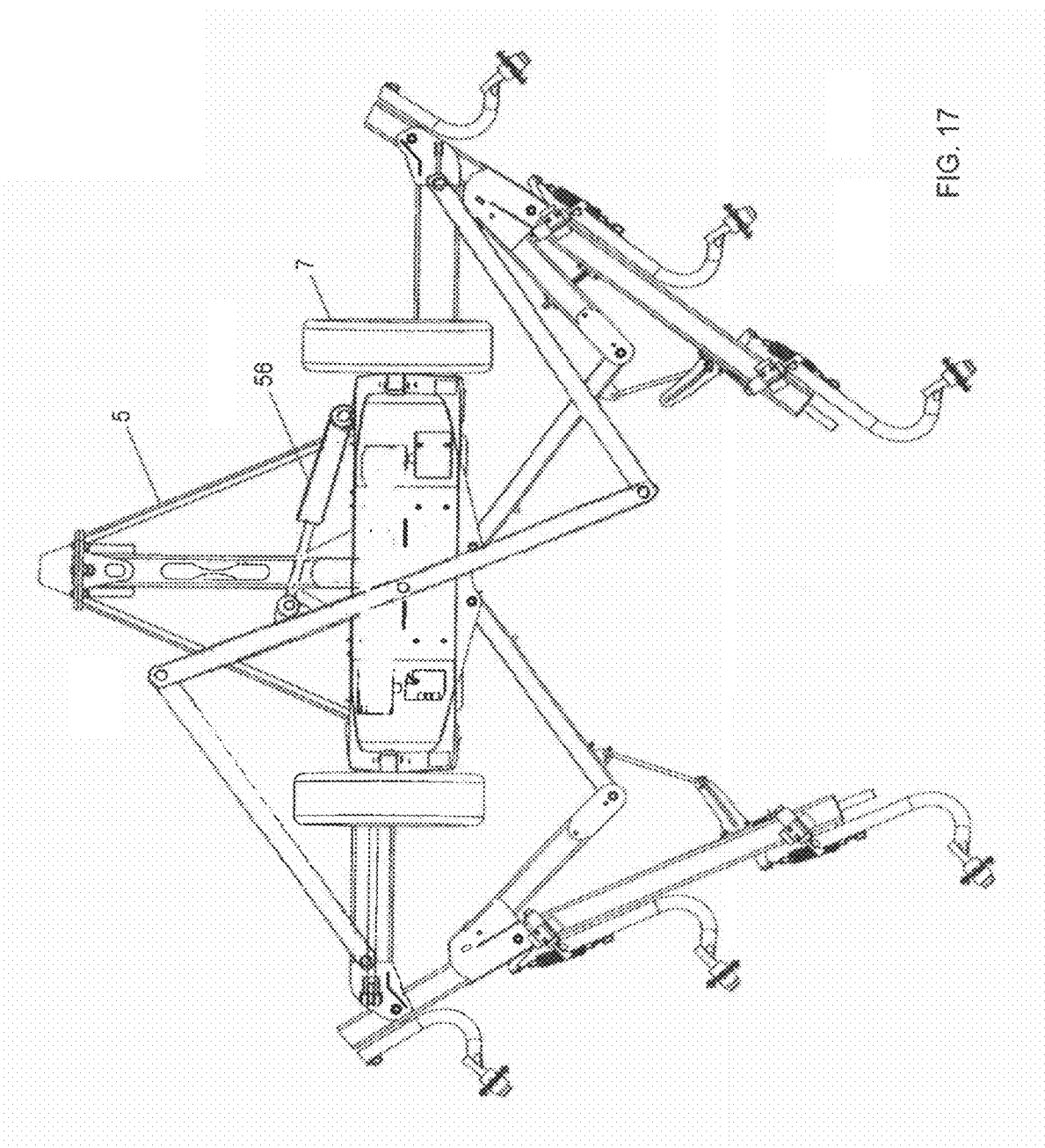
FIG. 17 is similar to FIG. 15, but the rake arm positioners are both moved via the rotating link, which is rotated by a cylinder.

FIG. 17 depicts a fluid cylinder 56 pivotably coupled to the rotational member 54. In the examples shown in FIG. 17, the fluid cylinder 56 provides the rotational force for rotating the rotational member 54 and moving both rake arm positioners. Accordingly, an operator, perhaps within the cab of the tractor or truck pulling the adjustable rake 1, can actuate the adjustable rake 1 from a transport position to a working position by operating a switch controlling fluid flow to the cylinder 56.

The arrangement shown in FIGS. 15-16 typically operates based on the movement of only one fluid cylinder 56. As the movement (change in length) of the fluid cylinder 56 is mechanically linked to the first and second rake arm positioners 50, there is less chance that the first and second rake arm positioners 50 will move out of phase with each other. This benefit is supplemented by the fact that the use of one fluid cylinder rather than two fluid cylinders simplifies the control scheme used to control translation of the rake arm positioners 50.

In order to move one side of the adjustable rake 1 without moving the other, similar to the arrangement shown in FIGS. 13 and 14, an operator will typically remove one link, for example, one of the members 52 from one side of the adjustable rake 1. Thus, movement of the fluid cylinder 56 will change the position of only one side of the adjustable rake and not the other. The removed link, e.g., member 52, is typically stored on the adjustable rake 1, for example, in the cart 5.

Figure 18:
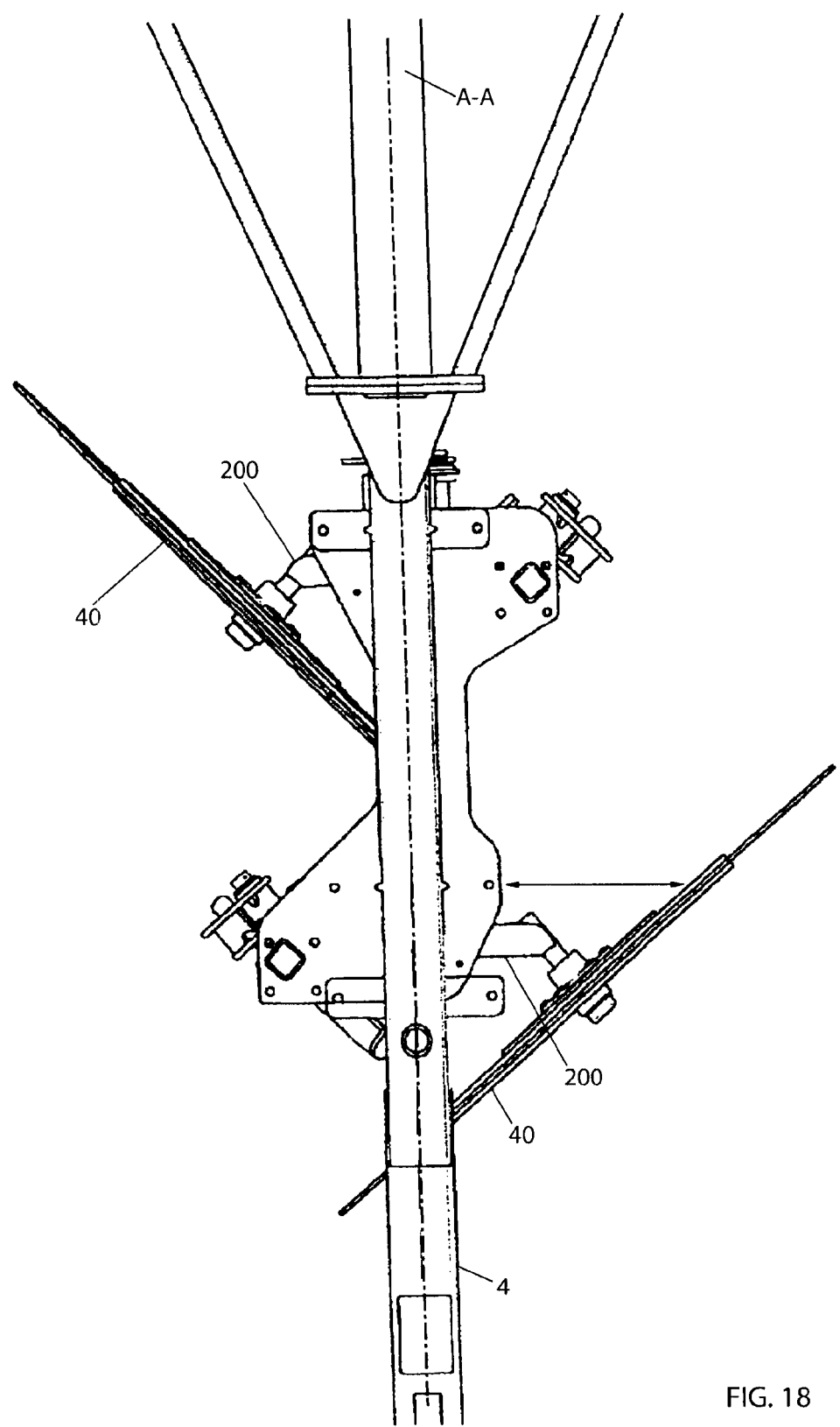
FIG. 18 is a detailed view of a tongue of the rake shown in FIG. 1, but with internal rake wheels attached to the tongue.
Figure 19:
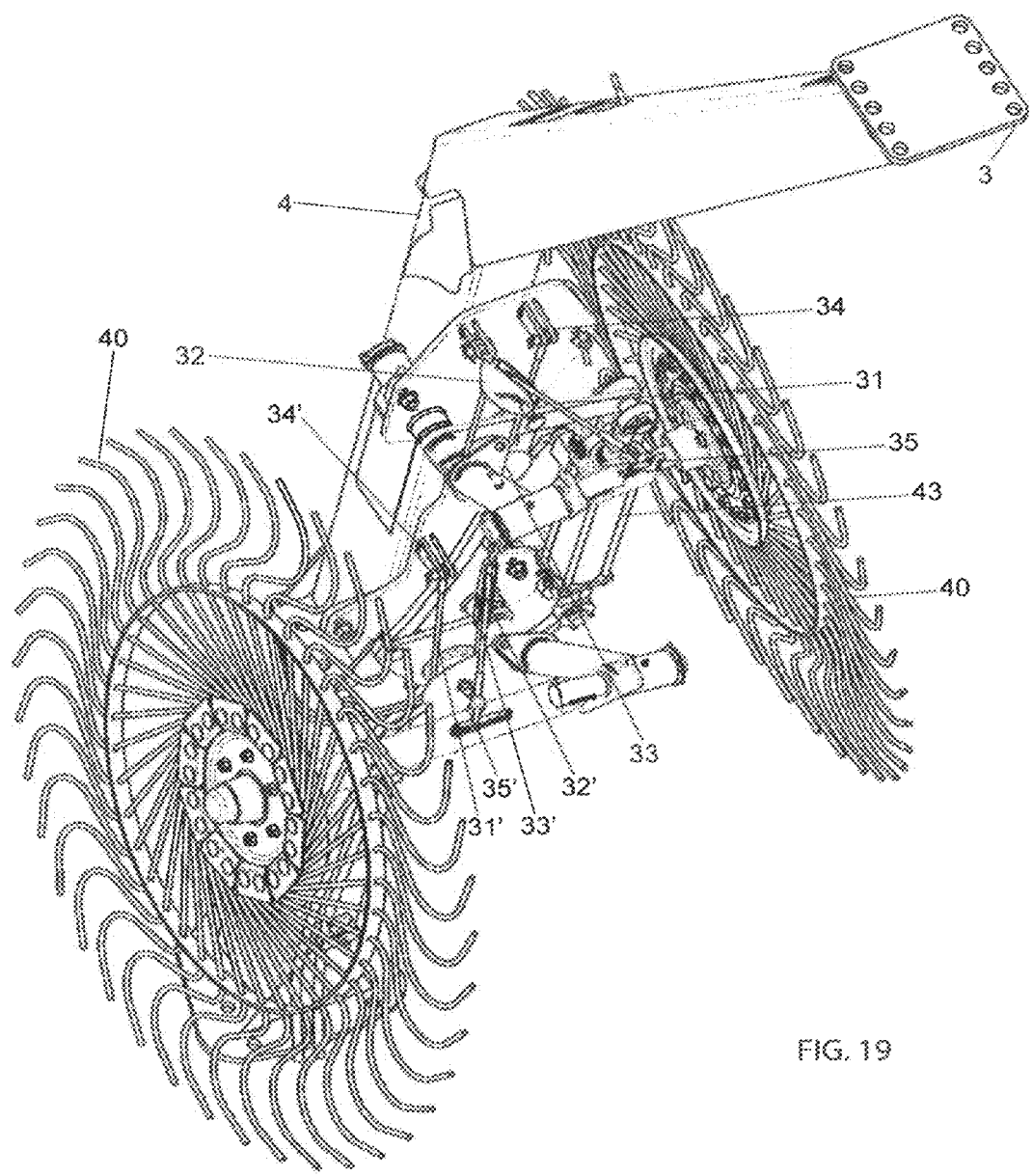
FIG. 19 is a perspective view of auxiliary ("splitter") wheels in a transport position.

FIG. 18 shows optional "splitter" or "auxiliary" rake wheels 40 coupled to the tongue 4 rather than to the front rake arm assemblies 10 or rear rake arm assemblies 20. In other words, in this example, a portion of the central portion or the entire central portion of the V formed by the adjustable rake 1 may be swept by additional rake wheels disposed along this center portion. This is beneficial because, as discussed previously, the bottom part of the V or rear portion of the adjustable rake 1 typically includes a gap or distance between the rearmost rake wheels 40 (disposed on the rear rake arm assemblies 20) and the center line of the adjustable rake 1A-A, even if this distance is adjustable.

One benefit of providing auxiliary rake wheels 40 on the tongue 4 is that material near the center of the V (in the above-noted gap) can be picked up and moved outward, at which point, as the rake continues its forward motion, the rake wheels 40 disposed on the front rake arm assemblies 10 and rear rake arm assemblies 20 will rake the cut material into the windrow formed by the bottom the V of the adjustable rake 1. Therefore, cut material in the gap between the rear rake arm assemblies 20 is not allowed to remain untouched (unraked) as the adjustable rake 1 passes over the cut material. Rather, material in the center of the V formed by the adjustable rake 1 is overturned to allow for drying, even if this material is eventually repositioned by the front and rear rake arm assemblies 10, 20 into the windrow covering the ground on which the cut material was originally positioned.

As noted above, the bottom part of the V of the adjustable rake is typically adjustable, depending on the preference of the operator. In order to accommodate the differences in possible widths of the bottom of the V, it is beneficial to allow positional adjustment of any auxiliary rake wheels directly coupled to the tongue 4, i.e., not coupled to one of the front or rear rake arm assemblies 10, 20.

FIG. 18 depicts one embodiment of the invention in which the rake arm wheels 40 coupled to the tongue 4 move inward and outward on movable members 200 as shown by the arrows in FIG. 18. In one embodiment, the movable members 200 translate. In another embodiment, the movable members 200 rotate. In another embodiment, the movable members 200 translate and rotate. FIGS. 19-26 describe a further embodiment of auxiliary rake wheels 40. A comparison between FIGS. 20 and 22 demonstrates that the auxiliary rake wheels 40 move inward to a travel position (FIG. 20) and move outward relative to a longitudinal axis A-A that runs along the direction of travel and through the center of the tongue 4. The tongue 4 is typically disposed in a center of the V of the rake 1 and can be considered a central member.

FIGS. 20-23 depict a cable 31 (reference numbers are shown with a prime (') symbol for a respective companion rake wheel), pulley 32, pivot block 33, cable mount 34, rake arm cable mount 35 (rigidly connected to the rake arm), rake arm 36, rake arm mount 37, cylinder link 38, and rake arm mount link 39.

Figure 20:
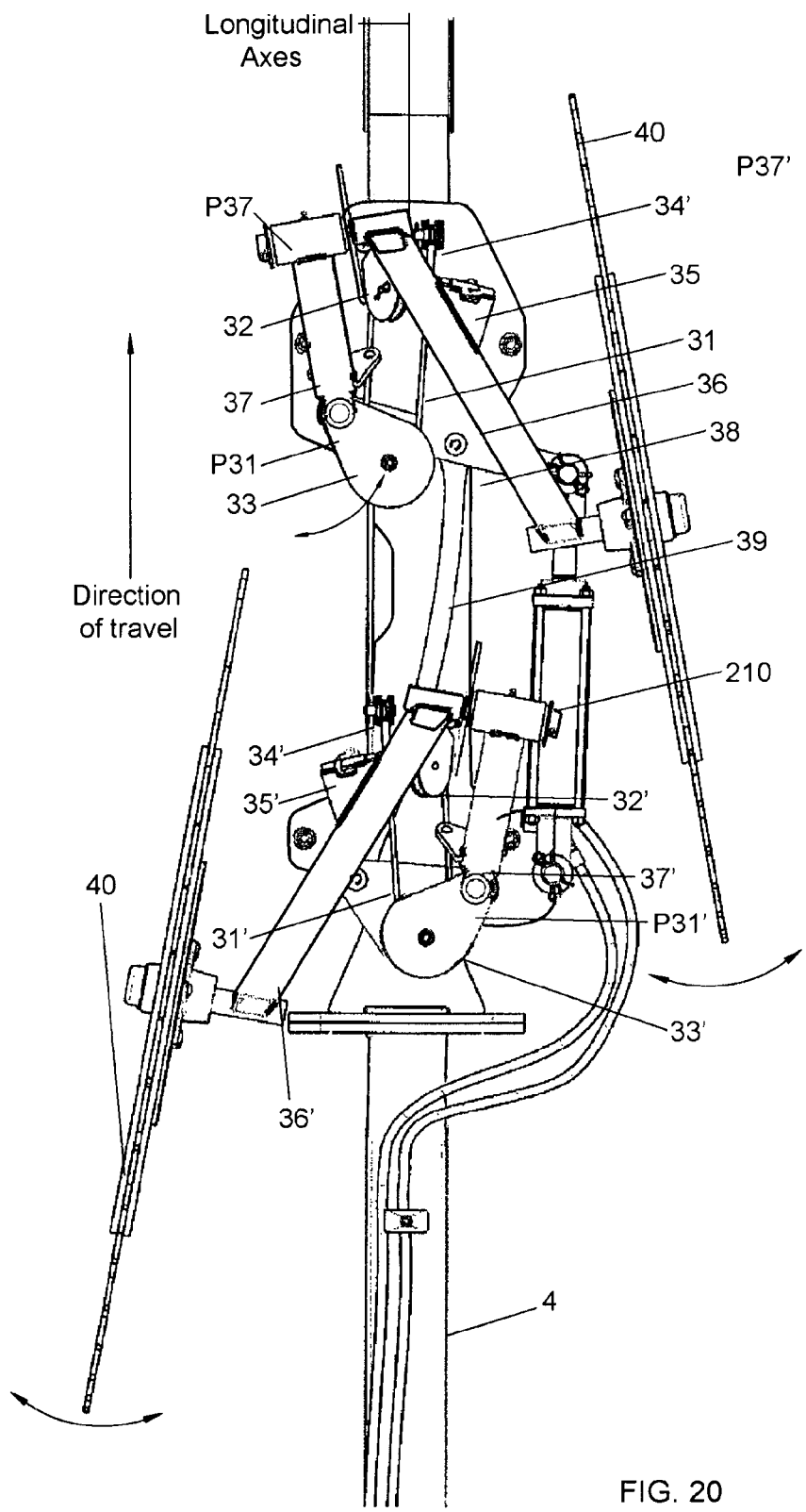
FIG. 20 is a bottom view of the splitter wheels of FIG. 19.
Figure 21:
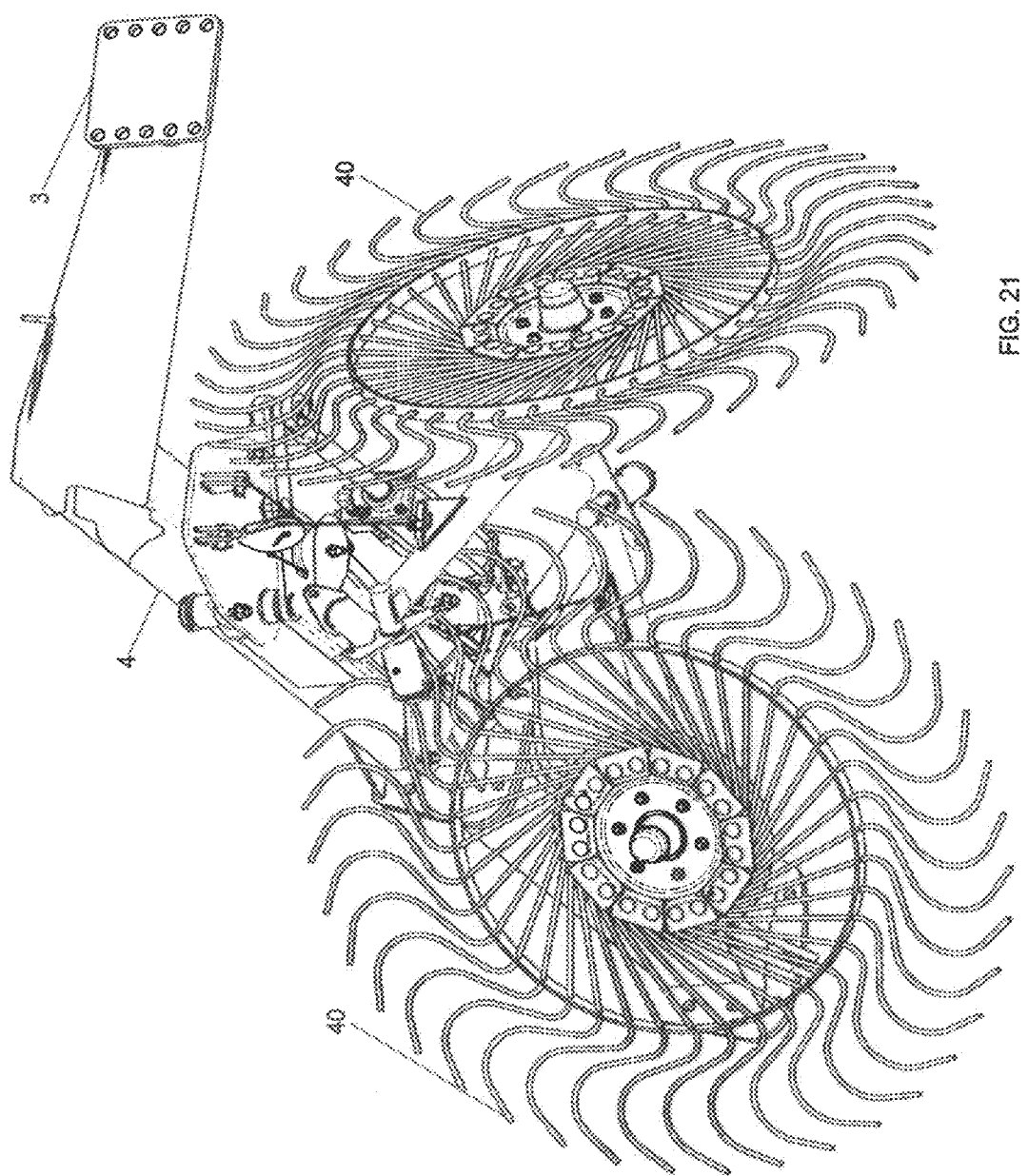
FIG. 21 is a perspective view of the splitter wheels of FIG. 19 in the working position.
Figure 22:
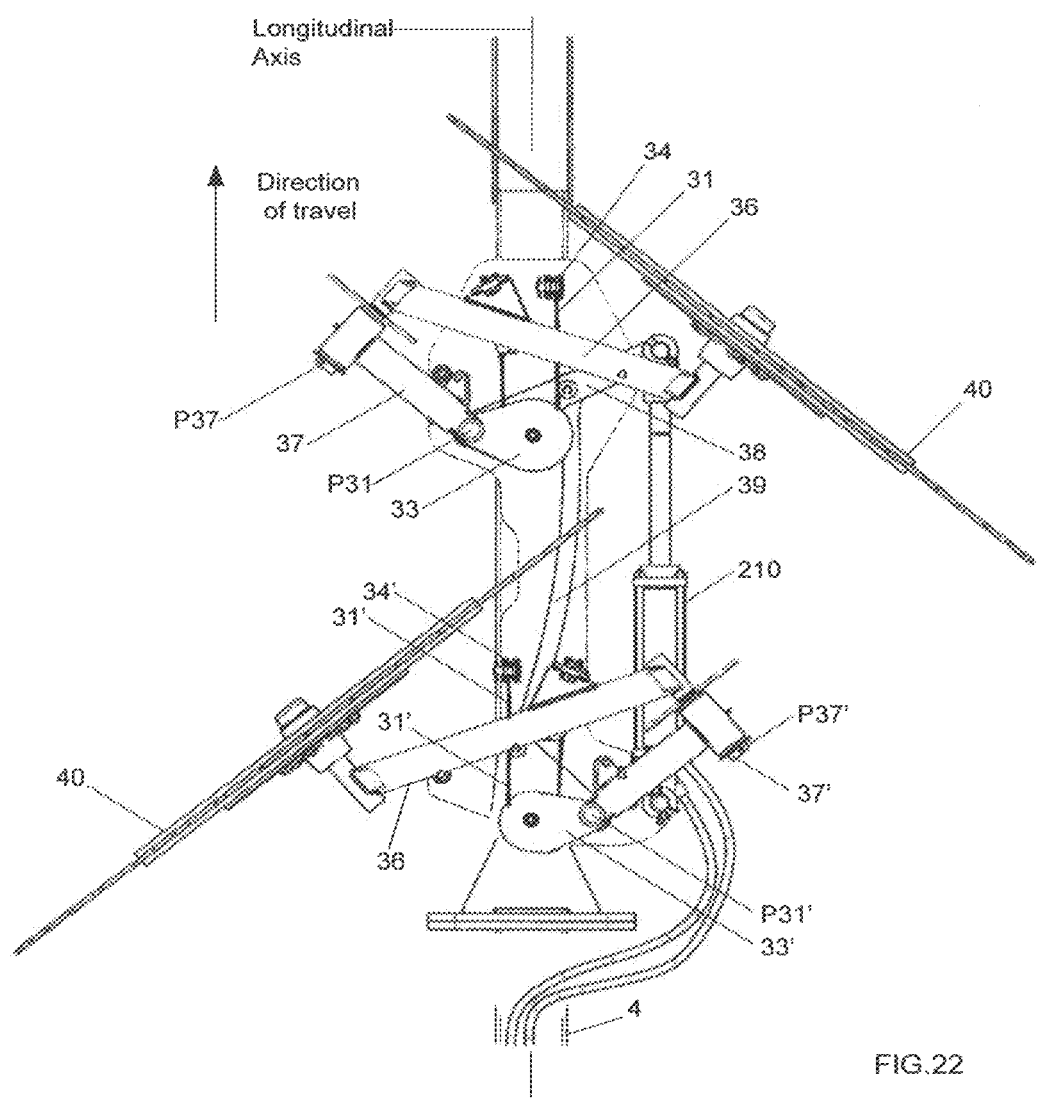
FIG. 22 is a bottom view of the splitter wheels of FIG. 19 in the working position.

As shown in FIGS. 20, 22, and 23, the cylinder link 38 is rigidly connected (typically welded) to a rake arm mount 37 in order to allow connection of a cylinder 210, which moves the auxiliary rake wheels up and down and inward and outward. The cylinder link 38 is rigidly connected to the pivot block 33, i.e., they are typically welded together, and the pivot block 33 pivots about pivot P31. The pivot block 33 (see FIG. 20) is rigidly connected to the rake arm mount 37 and is positioned such that, when the rake arm mount 37 rotates due to the movement (a change in length) of the cylinder 210, the pivot block 33 rotates about a relatively large radius and causes a large displacement in the cable 31. In the case of going from a working position to a transport position, this movement causes the pivot block 33 to move away from the fixed cable mount 34 and pulley 32. As the pivot block 33 is connected to the pulley 32 via a cable 31, which is in turn connected to the rake arm cable mount 35, the above-noted movement pulls the rake arm upward (about pivot P37) and inward. In other words, the extra length of cable 31 needed between the fixed mount 34 and pulley 32 due to the movement of the cylinder 210 is gained from the part of the cable disposed between the pulley 32 and the rake arm cable mount 35, thereby lifting the rake arm 36.

One benefit of this arrangement is that the movement of the cylinder 210 typically provides a large amount of cable movement (and in turn rake arm lift) with a relatively small rake wheel angle change as the auxiliary rake wheel moves from the transport position to the working position. As is evident from FIG. 23, the cable 31 is connected between the pivot block 33 and pulley 32 via a "double" connection whereas the cable 31 between the pulley 32 and the rake arm cable mount 35 is only a "single" connection. Therefore, movement of the pivot block 33 away from the pulley 32 causes twice as much of a change the distance between the pulley 32 and the connection with the rake arm cable mount 35.

The link 39 acts as a proxy for the cylinder 210, for the rake wheel not directly operated by the cylinder 210, i.e., the left rake wheel 40 shown in FIGS. 20 and 22. As shown in FIG. 22, the link 39 extends from a pivotable connection on the cylinder link 38 toward the rear of the rake 1. As shown in a comparison of FIGS. 20 and 22, when the cylinder 210 extends, the link 39 moves forward. As the link 39 is connected to the pivot block 33' toward the rear of the assembly shown in FIGS. 20 and 22, the pivot block 33' also moves forward (pivoting about pivot P31') when the cylinder 210 extends. Thus, the same type of motion for the left splitter wheel 40 can be achieved as is achieved for the right splitter wheel 40, even though only one cylinder 210 is used. Alternatively, two cylinders 210 may be used, but this tends to increase the complexity of the controls.

As best shown in FIG. 23, the components used to move/support the auxiliary rake wheels 40 may all be mounted on a base plate BP. The base plate BP may be rigidly coupled to the tongue 4 or equivalent central member. One benefit of this arrangement is that the base plate BP and associated components may be assembled as a subassembly and sold separately from the rake 1 or sold as an aftermarket kit for installation/retrofitting the rake 1 with auxiliary wheels 40. Additionally, the base plate BP provides more space for attachment of the above-noted components.

Figure 25:
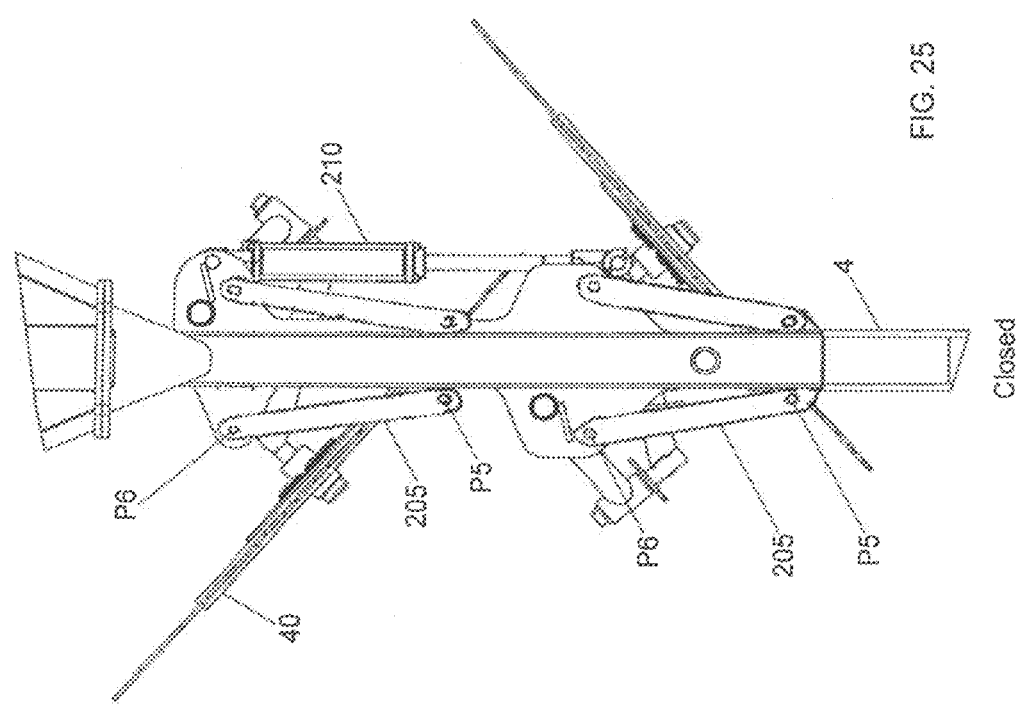
FIG. 25 is the enlarged version of the detailed view depicted in FIG. 24.
Figure 24:
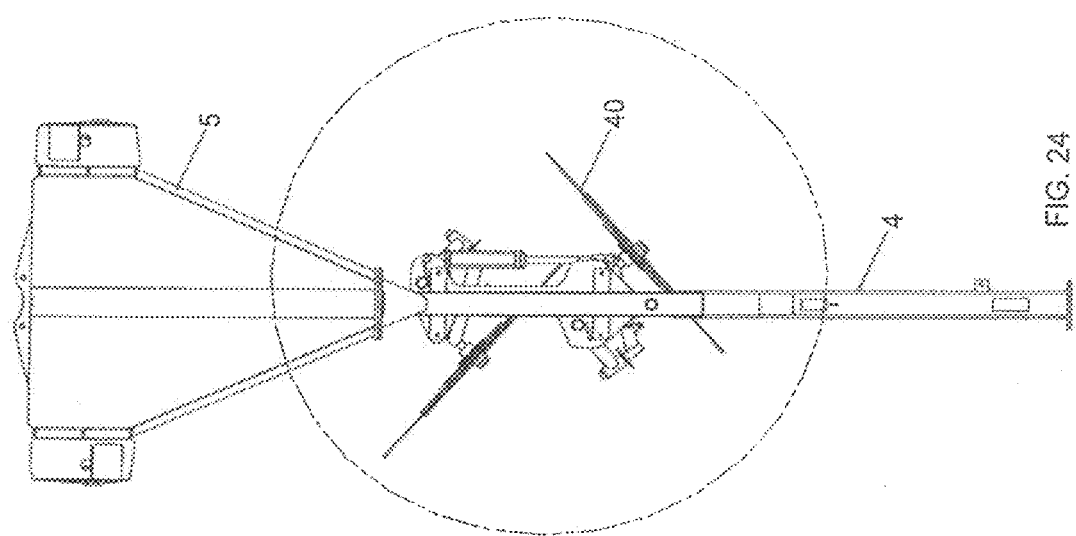
FIG. 24 is a view of an alternative embodiment of the tongue shown in FIG. 18 and identifying an area for a detailed view.

FIGS. 24-26 depict another arrangement in which a cylinder 210 is coupled to pivotable members 205 to move a frame member 212 inward and outward relative to the tongue 4. The rake wheels 40 are disposed on the frame member 212, and therefore, can be adjusted in position relative to the tongue 4 based on fluid input, for example, hydraulic input, to the cylinder 210.

Figure 27:
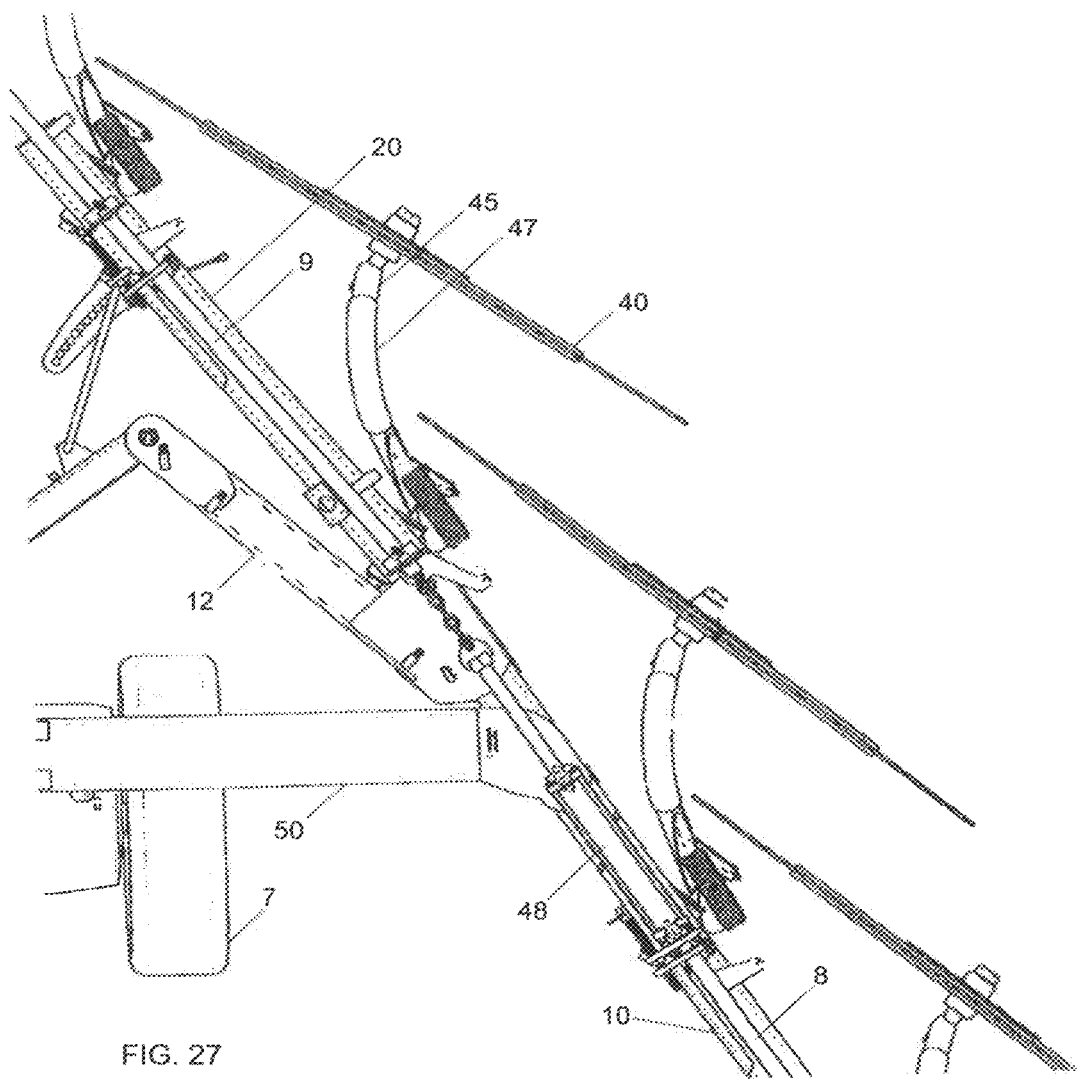
FIG. 27 is an enlarged view of rake arms as shown in FIG. 1 and including a protective shell attached to the rake arms.

FIG. 27 depicts rake wheels 40 as connected to the front and rear rake arm assemblies 10 and 20 via rake wheel arms 45. In this example, the rake wheel arms 45 include a protective shell 47. In one example, the protective shell is plastic. For example, the protective shell 47 may comprise polyethylene, polypropylene, polyester, or various other plastics. In one example, the protective shell 47 includes a sprayed on coating such as typically used in a spray-on bed liner for pickup trucks or other outdoor equipment. In some examples, the protective shell 47 includes steel, aluminum, or another metal. Further, the protective shell 47 may include a rubber or bumper-type material such as butyl rubber, neoprene, or nylon. One benefit of the protective shell 47 is that when the rake wheel arms 40 are disposed in a transport position, the rake wheel arms 45 are protected against collision and repeated impact with other parts of the adjustable rake 1, for example, when the adjustable rake 1 travels down a gravel road which may include divots and bumps or when the adjustable rake 1 is removed from the field.

Figure 32:
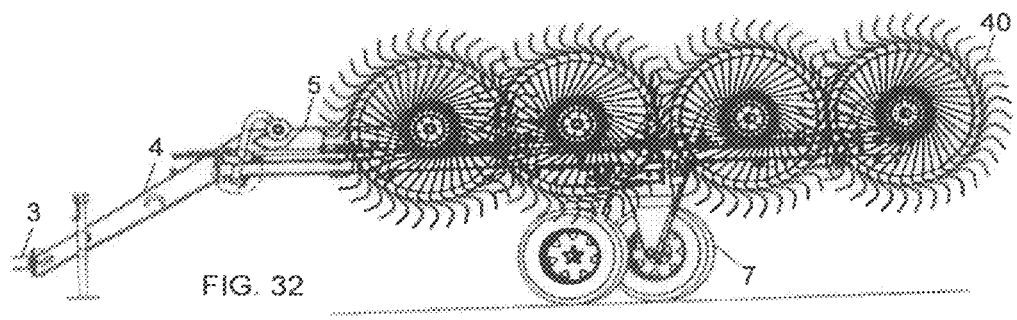
FIG. 32 is a side view of the rake depicted in FIG. 30, but with the rake wheels in an uppermost position.
Figure 33:
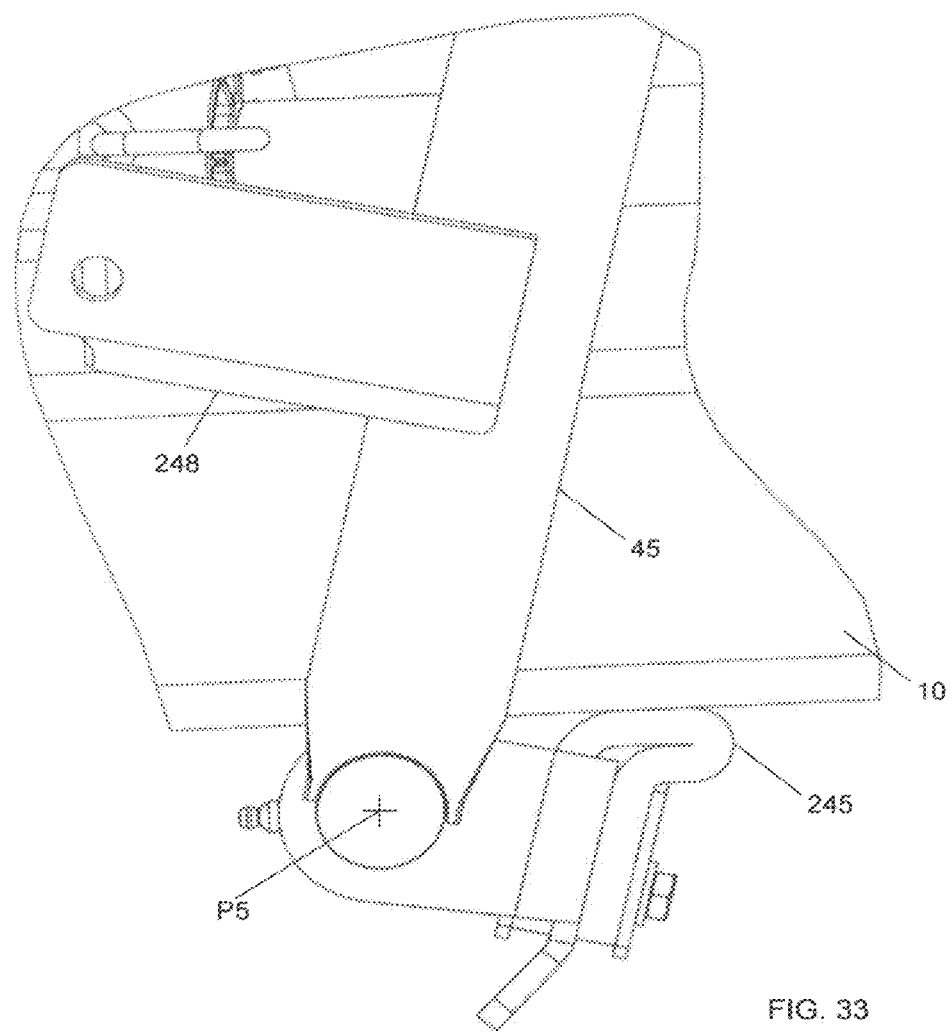
FIG. 33 is an enlarged view of an area of detail depicted in FIG. 32.

As noted above, during the transport of the adjustable rake 1, it is possible for certain parts of the adjustable rake 1 to collide with other parts of the adjustable rake 1. In order to ameliorate this problem, as shown in FIGS. 28-33, the adjustable rake 1 may include rake wheel arms 45 that progressively travel from a working position as shown in FIGS. 28 and 29 to a transport position as shown in FIGS. 30 and 31. FIGS. 32 and 33 depict a position of the rake wheel arm 45 which allows for more movement away from the ground in case of the rake wheel contacting the ground. A rake wheel arm cylinder 48 (see FIG. 27) pulls the rake wheel arms 45, and therefore, the rake wheels 40, into a transport position from a working position. The rake wheel arm cylinder 48 pulls the rake wheel arms via a lift rod 8 (see FIGS. 1 and 7). One lift rod 8 is typically disposed on or adjacent to each of the front rake arm assemblies 10 one lift rod 9 is typically disposed on or adjacent to each of the and rear rake arm assemblies 20. As the rake wheel arms 45 are pulled by the rake wheel arm cylinder 48, the rake wheel arms 45 pivot about a pivot point P5 shown in FIGS. 29, 31, and 33. The rake wheel arm cylinder 48 pulls the rake wheel arms 45 via a connection ear 248. As the rake wheel arms 45 pivot about the pivot point P5, a bumper 245 eventually comes into contact with the front rake wheel arm assembly or rear rake wheel arm assembly to which the respective rake wheel arms 45 are attached. The bumper 245 is typically formed of an elastic material such as one of the materials discussed above for the protective shell 47. The standard transport position is shown in FIG. 30, and can be achieved when the rods 8 and 9 pull the rake arm wheels upward as discussed with regard to FIGS. 17 and 27. The maximum deflection or maximum height of the rake wheel arms 45 is shown in FIG. 32, which may occur if the wheels receive an impact. The bumper 245 reduces the risk of damage to the rake wheel arms 45 and to other components of the adjustable rake 1 during transport. One way the bumper 245 reduces the risk of damage is providing a buffer effect to reduce bouncing as the rake 1 is transported. Another way the bumper reduces the risk of damage is by allowing a bit of extra deflection in case the rake 1 hits something that pushes against the rake wheel arms 45.

FIGS. 34-39 depict one example of the adjustable rake 1 including a tandem axle arrangement for the transport wheels 7. In this arrangement, the tandem axle pivots around the pivot point P6 depicted in FIGS. 35, 37, and 39. One benefit of the arrangement shown in FIGS. 34-39 is that, as the adjustable rake 1 encounters a hill, or ridge, the front transport wheel 7 will lift while the rear transport wheel 7 drops. As the pivot point P5 passes beyond the ridge, the front transport wheel 7 will drop down as the rear transport wheel 7 lifts as shown in FIG. 15C2. Thus, the adjustable rake 1 can more smoothly accommodate ridges or small hills it encounters as it travels through the field. The tandem axle arrangement shown in FIGS. 34-39 may be used with any of the configurations of the adjustable rake described above.

Additionally, comparison of FIGS. 37 and 39 show two different states of a limiter 41. As shown in FIG. 37, the limiter 41 is in the first position, and the limiter 41 limits the amount of rotation range available to the tandem axle. In other words, when the limiter 41 is in the first position, the amount that the tandem axle can rotate about the pivot point P6 is a first amount, and when the limiter 41 is in the second position, shown in FIG. 39, the amount that the tandem axle can rotate about the pivot point P6 is a second amount. The second amount of rotation is less than the first amount of rotation.

Typically, a bolt 42 will be used to tighten the limiter 41 to keep it in the desired position.

Figure 40:
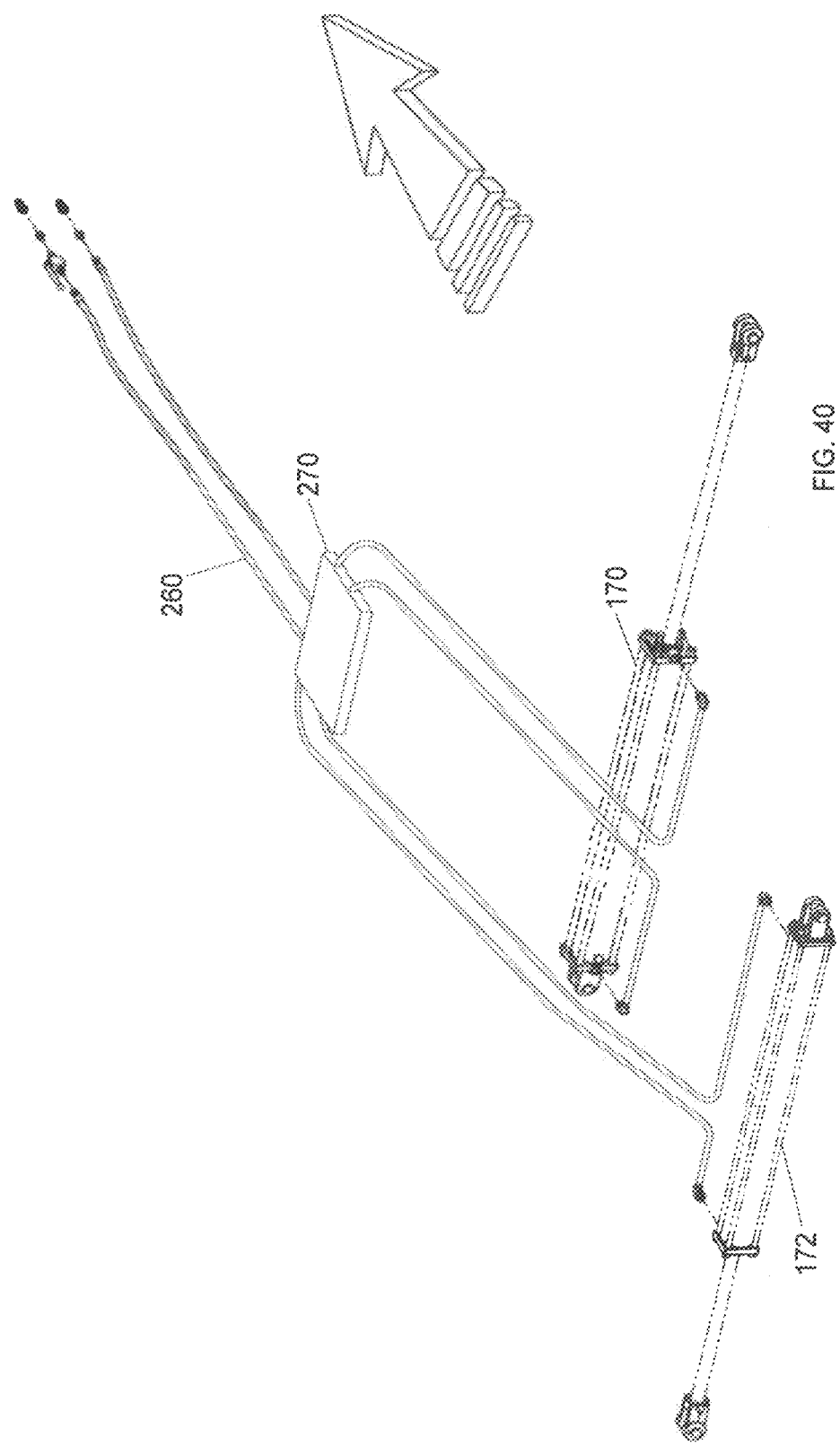
FIG. 40 is a view of one example of a fluid connection for controlling cylinders depicted in FIG. 1.

FIG. 40 depicts a "split valve" arrangement for controlling the cylinders 170 and 172 that move the rake arm adjusters 50 inward and outward. In this arrangement, a supply line 260 supplies fluid, typically hydraulic fluid, to a split valve 170 which diverts flow to one side of a piston disposed within each of the cylinders 170, 172. Thus, the rake arm positioners 50 will move inward and outward at substantially an equal rate.

In another arrangement, as shown in FIG. 41, a "master-slave" arrangement is provided for the first fluid cylinder 172 and second fluid cylinder 170. In this embodiment, fluid passes into one port, opposite the rod, on the second cylinder 170, and this fluid pushes the piston within the cylinder and therefore pushes the rod toward the right as shown in FIG. 41. A corresponding amount of fluid on the other side (on the rod-side) of the piston disposed in the second cylinder 170 must exit the cylinder 170. This fluid exits the first cylinder 170 by passing into a port on the first cylinder 172. Thus, the rods of the cylinders will displace linearly by an equal amount inasmuch as an equal amount of fluid displacement occurs in each of the cylinders 170, 172. In this way, the motion of the rake arm positioners 50 can be synchronized. The reverse of the above-noted sequence may also be performed.

In order to account for possible leakage in the master-slave arrangement described in FIG. 41, periodically, perhaps every time the adjustable rake 1 is placed in the transport position, the cylinders will be "rephased." In other words, both of the cylinders will be moved in one direction to the maximum extent possible. In this way, the occurrence of possible leakage of fluid past the piston inside the cylinders will not cause the first and second fluid cylinders 172, 170 to move out of synchronization or move with an unintended off-set from one another.

Various modifications of the components above are included in the present disclosure. For example, any of the cylinders described above may be replaced with an actuator such as a motor powered by air, liquid, or electricity. Additionally, the cylinders may be replaced with other types of linear actuators such as those powered by electricity. Moreover, the cylinders themselves may be operated with hydraulic fluid or another fluid such as a gas, e.g., air.

Although the above-noted embodiments all depict a carted rake, the various actuators, linkages, splitter wheels, and pulleys may be implemented on non-carted rakes, for example, rakes such as the one depicted in U.S. Pat. No. 7,584,595.

Obviously, numerous modifications and variations of the present invention are possible in light of the above teachings. It is therefore to be understood that within the scope of the appended claims, the invention may be practiced otherwise than as specifically described herein.

The invention claimed is:

1. An adjustable rake for raking agricultural products, the adjustable rake comprising:
   a wheeled cart configured to be pulled in a direction of travel on a surface of travel, the wheeled cart including a central frame and transport wheels attached to the central frame;
   first and second rake arm positioners coupled to the wheeled cart and configured to translate in a direction transverse to the direction of travel of the wheeled cart;
   first and second front rake arm assemblies pivotably coupled to the first and second rake arm positioners, respectively;
   a first rear rake arm assembly pivotably coupled about a same first axis to the first front rake arm assembly, and a second rear rake arm assembly pivotably coupled about a same second axis to the second front rake arm assembly, the first and second axes being perpendicular to both the direction of travel of the wheeled cart and to the direction transverse to the direction of travel of the wheeled cart;
   an adjustment link coupled to the first rear rake arm assembly which is configured to control a distance of an end of the respective first rear rake arm assembly from a center line of the cart; and
   first and second inner supports, each of the first and second inner supports being pivotably coupled to the wheeled cart and being configured to pivot as a result of translation of the first and second rake arm positioners in the direction transverse to the direction of travel of the wheeled cart, and
   wherein a width between the first and second front rake arm assemblies is adjustable independent of a width between the first and second rear rake arm assemblies, and
   wherein the adjustment link maintains the distance of the end of the first rear rake arm assembly from the center line of the cart at a substantially constant value while the first rake arm positioner translates from a first position to a second position.

2. The adjustable rake according to claim 1, wherein the first and second rear rake arm assemblies pivot, relative to the front rake arm assemblies as a result of the translation of the first and second rake arm positioners.

3. The adjustable rake according to claim 1, wherein the adjustment link is pivotably coupled to the first rear rake arm assembly.

4. The adjustable rake according to claim 1, wherein the adjustment link maintains the distance of the end of the first rear rake arm assembly from the center line of the cart at a substantially constant value while the first rake arm positioner translates from a first position to a second position.

5. The adjustable rake according to claim 4, wherein the first position is a transport position, and the second position is a work position.

6. The adjustable rake according to claim 4, wherein the adjustment link is pivotably coupled to the first inner support.

7. The adjustable rake according to claim 4, wherein the adjustment link is coupled to the cart independently of the first inner support.

8. The adjustable rake according to claim 7, wherein the adjustment link is pivotably coupled directly between the cart and the first rear rake arm assembly.

9. The adjustable rake according to claim 7, wherein the adjustment link is coupled between the first rear rake arm assembly and a longitudinal member that extends from the cart.

10. The adjustable rake according to claim 9, wherein the adjustment link is pivotably coupled to the longitudinal member.

11. The adjustable rake according to claim 1, wherein the adjustment link is a turnbuckle.

12. The adjustable rake according to claim 1, further comprising a biasing device configured to bias a front end of the first front rake arm assembly vertically with respect to the surface of travel.

13. The adjustable rake according to claim 1, wherein the first and second rake arm positioners translate in response to movement of at least one hydraulic cylinder.

14. The adjustable rake according to claim 13, wherein the first and second rake arm positioners both translate in response to movement of the same hydraulic cylinder.

15. The adjustable rake according to claim 13, wherein the at least one hydraulic cylinder comprises first and second hydraulic cylinders, and the first and second hydraulic cylinders are configured to move in synchronization with each other.

16. The adjustable rake according to claim 13, wherein the at least one hydraulic cylinder comprises first and second hydraulic cylinders, and the first and second hydraulic cylinders are configured to periodically rephase so as to move in synchronization with each other.

17. The adjustable rake according to claim 1, wherein the first and second rake arm positioners translate in response to movement of at least one mechanical linkage.

18. The adjustable rake according to claim 1, wherein the first rake arm positioner is translatable independently of the second rake arm positioner.

19. The adjustable rake according to claim 1, further comprising a tongue connected to the cart and configured to couple the cart to a vehicle to pull the cart, wherein at least one auxiliary rake wheel is connected to the tongue independently of the rake first and second rake arm assemblies.

20. The adjustable rake according to claim 19, wherein the position of the at least one auxiliary rake wheel relative to the tongue is adjustable in the direction transverse to the direction of travel of the wheeled cart.

21. The adjustable rake according to claim 1, wherein the wheeled cart is supported on the surface of travel via a first wheel having a first axis of rotation and a second wheel having a second axis of rotation parallel to and non-colinear with the first axis of rotation,
the first and second wheels being linked to each other as a tandem axle arrangement that rotates around a third axis that is non-colinear with either of the first and second axes of rotation.

22. The adjustable rake according to claim 21, further comprising a limiter that limits a range of rotation of the tandem axle.

23. The adjustable rake according to claim 22, wherein the limiter is adjustable between at least first and second positions such that the range of rotation of the tandem axle is greater when the limiter is in the second position than when the limiter is in the first position.

24. The adjustable rake according to claim 23, wherein the range of rotation of the tandem axle when the limiter is in the first position is zero, such that the tandem axle cannot rotate.

25. The adjustable rake according to claim 1, further comprising at least one rake arm pivotably coupled to a first rake arm assembly and coupled to at least one rake wheel.

26. The adjustable rake according to claim 25, wherein each of the at least one rake arm is coupled to only one rake wheel.

27. The adjustable rake according to claim 25, wherein the first rake arm assembly is configured to move from a work position to a transport position by elevating relative to the surface of travel.

28. The adjustable rake according to claim 25, further comprising a protective shell disposed on the at least one rake arm.

29. The adjustable rake according to claim 25, further comprising a bumper disposed on the at least one rake arm and configured to abut a portion of the first rake arm assembly while the first rake arm assembly is in a transport position and to separate from the first rake arm assembly while the first rake arm assembly is in a work position.

30. The adjustable rake according to claim 29, wherein the bumper abuts the at least one rake arm to limit movement of the at least one rake arm in a direction the rake arm moves in transitioning from the work position to the transport position.

31. The adjustable rake according to claim 1, wherein each of the first and second inner supports is pivotably coupled to one of the first and second front rake arm assemblies.

\* \* \* \* \*